United States Patent
Wakabayashi et al.

(10) Patent No.: US 9,862,824 B2
(45) Date of Patent: Jan. 9, 2018

(54) CARBON FIBER SIZING AGENT, AQUEOUS DISPERSION THEREOF, CARBON FIBER BUNDLE APPLIED WITH SIZING AGENT, SHEET-LIKE ARTICLE COMPRISING CARBON FIBER BUNDLE, AND CARBON FIBER REINFORCED COMPOSITE MATERIAL

(75) Inventors: Kouki Wakabayashi, Aichi (JP); Naoki Sugiura, Aichi (JP); Masahiro Hata, Aichi (JP); Shigekazu Takeda, Aichi (JP); Keigo Yoshida, Aichi (JP); Shuuichi Nakamura, Aichi (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 14/240,161

(22) PCT Filed: Aug. 21, 2012

(86) PCT No.: PCT/JP2012/071018
§ 371 (c)(1),
(2), (4) Date: Feb. 21, 2014

(87) PCT Pub. No.: WO2013/027708
PCT Pub. Date: Feb. 28, 2013

(65) Prior Publication Data
US 2014/0256855 A1  Sep. 11, 2014

(30) Foreign Application Priority Data
Aug. 22, 2011  (JP) ................................. 2011-180696

(51) Int. Cl.
*C08L 75/04* (2006.01)
*D06M 15/55* (2006.01)
(Continued)

(52) U.S. Cl.
CPC ............... *C08L 75/04* (2013.01); *C08J 5/042* (2013.01); *C08J 5/06* (2013.01); *C08L 63/00* (2013.01);
(Continued)

(58) Field of Classification Search
CPC .. D06M 13/11; D06M 15/564–15/579; D06M 15/55; D06M 2101/40;
(Continued)

(56) References Cited

U.S. PATENT DOCUMENTS 3,947,504 A   3/1976  Koy et al.
4,167,538 A   9/1979  Taniguchi et al.
(Continued)

FOREIGN PATENT DOCUMENTS

CN    1701148 A    11/2005
JP    53-52796     5/1978
(Continued)

OTHER PUBLICATIONS

Machine translation of JP 2008-095241 A.*
(Continued)

*Primary Examiner* — Kregg T Brooks
(74) *Attorney, Agent, or Firm* — Morgan, Lewis & Bockius LLP

(57) ABSTRACT

The present invention provides: a carbon fiber sizing agent that can obtain a carbon fiber bundle having a superior effect of improving mechanical properties when composited using a resin; an aqueous dispersion thereof; a carbon fiber bundle; a sheet-shaped article having a carbon fiber bundle; and a composite material. The carbon fiber sizing agent contains: a compound (A) that is an ester of an unsaturated monobasic acid and an epoxy compound having a plurality of epoxy groups in the molecule, and that has at least one epoxy group in the molecule; a urethane acrylate oligomer (B) that is
(Continued)

bifunctional and that has a tensile elongation rate of the cured product of at least 40%; and a polyurethane resin (C) having a tensile elongation rate of a dried coating film of 350-900% inclusive. The amounts of A-C contained satisfy the conditions described in the description. The aqueous dispersion disperses the sizing agent. The carbon fiber bundle contains 0.6-3.0 mass % inclusive of the sizing agent. The sheet-shaped article and a pultruded composite material contain the carbon fiber bundle. The composite material contains the sheet-shaped article.

14 Claims, 1 Drawing Sheet

(51) Int. Cl.
| | | |
|---|---|---|
| D06M 15/564 | (2006.01) | |
| C08L 63/00 | (2006.01) | |
| C08J 5/06 | (2006.01) | |
| C08J 5/24 | (2006.01) | |
| D06M 101/40 | (2006.01) | |
| C08L 67/02 | (2006.01) | |
| D06M 15/507 | (2006.01) | |
| D06M 13/11 | (2006.01) | |
| D06M 13/224 | (2006.01) | |
| C08J 5/04 | (2006.01) | |
| C09D 163/10 | (2006.01) | |

(52) U.S. Cl.
CPC ........... *C09D 163/10* (2013.01); *D06M 13/11* (2013.01); *D06M 13/2246* (2013.01); *D06M 15/55* (2013.01); *D06M 15/564* (2013.01); *C08J 2300/24* (2013.01); *D06M 2101/40* (2013.01)

(58) Field of Classification Search
CPC ........... D06M 13/2246; C08G 18/672–18/673; C08G 59/1455–59/1466; C08L 63/00–63/10; C08L 75/04; C09D 163/00–163/10; C09D 175/04; C09J 163/00–163/10; C09J 175/04; C08K 3/04
See application file for complete search history.

(56) References Cited

U.S. PATENT DOCUMENTS

| | | | |
|---|---|---|---|
| 6,025,073 A | 2/2000 | Piret | |
| 2004/0197565 A1 | 10/2004 | Sugiura et al. | |
| 2010/0280151 A1* | 11/2010 | Nguyen | C08G 59/38 523/215 |
| 2012/0088879 A1* | 4/2012 | Yoshiwara | C08F 232/08 524/554 |

FOREIGN PATENT DOCUMENTS

| | | | |
|---|---|---|---|
| JP | 57-15229 | 3/1982 | |
| JP | 4-41779 | 2/1992 | |
| JP | 7-197381 | 8/1995 | |
| JP | 9-250087 | 9/1997 | |
| JP | 2002-506414 | 2/2002 | |
| JP | 2005-320641 | 11/2005 | |
| JP | 2007-131959 | 5/2007 | |
| JP | 2007-231441 | 9/2007 | |
| JP | 2008-95241 | 4/2008 | |
| JP | 4270810 B2 * | 6/2009 | |
| WO | 00/47656 A1 | 8/2000 | |
| WO | WO 2010147116 A1 * | 12/2010 | C08G 61/08 |
| WO | 2011/092962 | 8/2011 | |

OTHER PUBLICATIONS

Machine translation of JP 4270810 B.*
Scifinder Properties of CAS 7473-98-5 (2016).*
Thor E. Smith, "Tensile Strength of Polyurethane and Other Elastomeric Block Copolymers," J. Polym. Sci. Polym. Phys. Ed., vol. 1825-1848 (1974).*
Michael Sepe, "The Effects of Temperature," Plastics Technology (Aug. 2011), found at http://www.ptonline.com/columns/the-effects-of-temperature (retrieved Feb. 15, 2017).*
Taiwan Office Action dated May 15, 2014 and partial English translation of same.
Office Action issued in counterpart European Patent Application No. 12826136.9 dated Jan. 16, 2017.

* cited by examiner

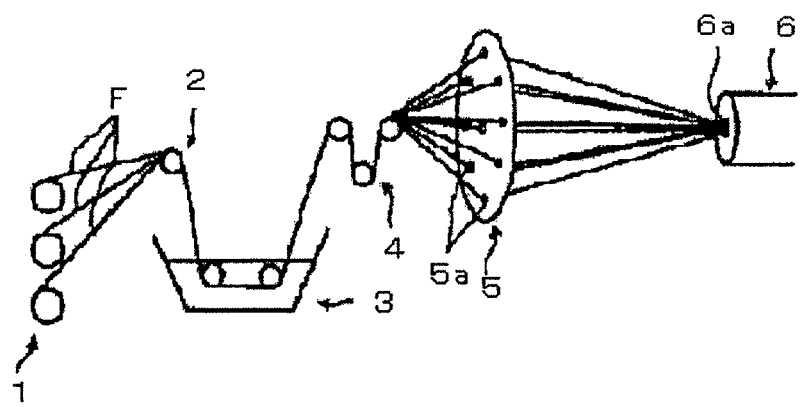

CARBON FIBER SIZING AGENT, AQUEOUS DISPERSION THEREOF, CARBON FIBER BUNDLE APPLIED WITH SIZING AGENT, SHEET-LIKE ARTICLE COMPRISING CARBON FIBER BUNDLE, AND CARBON FIBER REINFORCED COMPOSITE MATERIAL

TECHNICAL FIELD

The present invention relates to a sizing agent for carbon fiber, an aqueous dispersion thereof, a carbon fiber bundle applied with the sizing agent, a sheet-like article, and a carbon fiber-reinforced composite material.

BACKGROUND ART

Carbon fibers are used in a wide variety of fields as carbon fiber-reinforced composite materials that are formed by being compositized with a resin (hereinafter, described as a matrix resin) such as an epoxy resin, an unsaturated polyester resin, a vinyl ester resin or an acrylic resin, and then molded.

Regarding the method for producing a carbon fiber-reinforced composition, a method of impregnating fibers as a reinforcing material with a matrix resin is generally used. Examples of the method of impregnating fibers with a matrix resin include a prepreg method of thinly applying a matrix resin on a releasable paper and spreading fibers thereon in one direction; and a dipping method of passing fibers through a matrix resin bath.

Furthermore, regarding the molding method, there are known a method of laminating sheet-like articles and thermally curing the laminate under pressure using an autoclave; pultrusion molding of mixing one to several hundred carbon fiber bundles, impregnating the carbon fiber bundles with a matrix resin, and then curing the matrix resin through a die, a mold or the like; and a hand lay-up method of impregnating a textile base material such as a fabric or a sheet-like article with a resin at normal temperature, and directly curing the resin.

A carbon fiber-reinforced composite material formed from carbon fibers and a matrix resin by using the carbon fibers as a reinforcing material, is lightweight and has excellent strength and elastic modulus. In regard to such a composite material, development of applications thereof is underway in a wide variety of fields as a material for constituent components for sports and leisure goods, a base material for vehicles and aerospace crafts, and an industrial material for energy and civil construction. Therefore, there is a very strong demand for an enhancement of the performance of carbon fibers as a reinforcing material.

Particularly, for the carbon fibers that are applied as a structural material for vehicle and aerospace applications or as an industrial material, development intended for an increase in strength and an increase in elastic modulus is underway. Such a composite material for the applications as a structural material or an industrial material needs to have a high level of tensile strength in the longitudinal direction of the fiber. However, since orientation disorder or tortuosity of the carbon fiber filaments occurs in the pultrusion molding and hand lay-up method described above, there has been a problem that it is difficult for the mechanical properties such as tensile strength expected from a carbon fiber-reinforced composite material to be exhibited.

Furthermore, a carbon fiber in general is a filament having a diameter of about 5 µm to 8 µm, and is used in the form of several thousand to several ten thousand units of this single fiber being collected together (hereinafter, described as "carbon fiber bundle"). Since carbon fibers themselves have low elongation and exhibit brittleness, carbon fibers are prone to fuzzing due to mechanical friction and the like, and fuzzing and yarn breakage are prone to occur during the production process for a composite material. Therefore, for the purpose of suppressing the occurrence of fuzzing, carbon fibers are often subjected to a sizing treatment by applying various sizing agents. Furthermore, carbon fibers are generally used in the form of a fabric or the like produced by processing the carbon fiber bundles using a weaving machine. In order to produce a high quality carbon fiber-reinforced composite material in an industrially stable manner, it is required that in the process of impregnating fibers with a matrix resin, impregnation of carbon fiber bundles with the matrix resin be achieved readily and completely. However, carbon fibers in their original state lack wettability against matrix resins, and are not easily impregnated with a matrix resin. Therefore, it is difficult to obtain a fiber-reinforced composite material having a sufficiently satisfactory product quality. Even for the purpose of improving this, it is effective to perform a sizing treatment on carbon fibers.

That is, carbon fibers are subjected to a treatment using a sizing agent, for the purpose of enhancing product quality by enhancing handle ability of the carbon fibers, further enhancing wettability against a matrix resin, and thus manifesting the mechanical properties such as tensile strength expected from a carbon fiber-reinforced composite material at a high level.

Patent Document 1 proposes a sizing agent that uses polyglycidyl ethers and the like (hereinafter, referred to as "sizing agent 1"), and Patent Document 2 and Patent Document 3 each propose a sizing agent containing, as essential components, an epoxy resin, a condensate between an unsaturated dibasic acid and an alkylene oxide adduct of a bisphenol compound, and an alkylene oxide adduct of a phenol compound selected from monocyclic phenols and polycyclic phenols (hereinafter, referred to as "sizing agent 2").

The sizing agent 1 has excellent impregnating ability or interfacial adhesive force; however, it cannot be said that the sizing agent 1 has satisfactory adhesiveness to radical polymerization type resins such as unsaturated polyester resins, vinyl ester resins, and acrylic resins.

Furthermore, the sizing agent 2 can be expected to have enhanced adhesiveness to matrix resins, particularly unsaturated polyester resins, and when an epoxy resin is used as a matrix resin, the sizing agent 2 enables the properties of the fiber-reinforced composite material to be maintained. However, it cannot be said that the sizing agent 2 has satisfactory adhesiveness to radical polymerization type resins.

Patent Document 4 proposes a sizing agent including an ester resin containing one or more epoxy groups, urethane acrylate, an anionic emulsifier and a small amount of a nonionic emulsifier (hereinafter, referred to as "sizing agent 3").

The sizing agent 3 has excellent adhesiveness to radical polymerization type resins such as unsaturated polyester resins, vinyl ester resins and acrylic resins, and can provide performance that is equivalent to that of composite materials containing epoxy resins as matrix resins. Furthermore, the sizing agent may also have satisfactory suitability to epoxy resins, and can exhibit excellent mechanical strength in composite materials combined with a wide range of thermosetting resins.

However, this sizing agent cannot be said to have a satisfactory effect of suppressing orientation disorder or tortuosity of carbon fiber filaments at the time of molding processing, which causes a decrease in strength of a carbon fiber-reinforced composite material.

Furthermore, Patent Document 5 and patent Document 6 each propose a sizing agent containing a polyurethane resin (hereinafter, referred to as "sizing agent 4"). When a sizing agent contains a polymer compound such as a polyurethane resin, it is effective in suppressing the phenomenon of orientation disorder or tortuosity of carbon fiber filaments at the time of molding processing. However, since the sizing agent 4 substantially uses a polyurethane resin at a proportion of 100%, and is designed for thermoplastic resin reinforcement such that the softening temperature of a dried coating film of the sizing agent would be 50° C. to 150° C., in the case of performing a resin impregnation operation near room temperature as in the case of a composite material using a radical polymerization type resin, resin impregnating ability is poor.

As such, a sizing agent that is effective against defective resin impregnation, or against the orientation disorder or tortuosity of carbon fiber filaments at the time of molding processing, which are causative of a decrease in strength of a carbon fiber-reinforced composite material, has not been found heretofore.

CITATION LIST

Patent Document 1: Japanese Examined Patent Application (JP-B) No. 57-15229
Patent Document 2: Japanese Patent Application Laid-Open (JP-A) No. 53-52796
Patent Document 3: JP-A No. 7-197381
Patent Document 4: JP-A No. 2008-95241
Patent Document 5: JP-A No. 2007-231441
Patent Document 6: JP-A No. 2007-131959

DISCLOSURE OF INVENTION

Problem to be Solved by the Invention

The present invention was achieved in view of such circumstances, and it is an object of the invention to provide a sizing agent for carbon fiber capable of producing a carbon fiber bundle which has excellent passability to a sizing treatment process, allows a sizing agent to be uniformly attached thereto, and also has excellent mechanical property enhancing effect when the carbon fiber bundle is compositized using a resin, particularly a radical polymerization type resin, and to provide an aqueous dispersion of the sizing agent. Furthermore, it is another object of the invention to provide a carbon fiber bundle having an excellent effect for enhancing the mechanical properties of a composite material; a sheet-like article comprising the carbon fiber bundle; and a carbon fiber-reinforced composite material, particularly a pultrusion molding composite material, having excellent mechanical properties.

Means for Solving Problem

According to the present invention, there is provided a sizing agent for carbon fiber containing:
a compound (A) having at least one epoxy group in the molecule, which is an ester between an epoxy compound having plural epoxy groups in the molecule and an unsaturated monobasic acid;
a bifunctional type urethane acrylate oligomer (B) which gives a cured product having a tensile elongation of 40% or higher; and
a polyurethane resin (C) which produces a dried coating film having a tensile elongation of from 350% to 900%,
wherein the mass ratio of the contents of the compound (A) and the urethane acrylate oligomer (B) is from 1/3 to 2/1 as a ratio of urethane acrylate oligomer (B)/compound (A),
the proportion of the total amount of the compound (A) and the urethane acrylate oligomer (B) in all of the sizing components is 20% by mass or more, and
the proportion of the polyurethane resin (C) in all of the sizing components is from 5% by mass to 50% by mass.

The sizing agent for carbon fiber of the present invention is preferably such that the tensile strength of a dried coating film of the polyurethane resin (C) is from 10 MPa to 50 MPa.

The sizing agent for carbon fiber of the present invention is preferably such that the glass transition temperature of the polyurethane resin (C) is from −50° C. to 35° C.

Furthermore, according to the present invention, there is provided an aqueous dispersion in which the sizing agent for carbon fiber is dispersed in water, wherein the average particle size of the dispersed particles of the sizing agent in the aqueous dispersion is 0.3 μm or less.

Furthermore, according to the present invention, there is provided a carbon fiber bundle formed from carbon fibers having the sizing agent for carbon fiber attached thereto (that is, a carbon fiber bundle having a sizing agent for carbon fiber attached thereto), wherein the amount of applied sizing agent is from 0.6% by mass to 3.0% by mass.

Alternatively, according to the present invention, there is provided a carbon fiber bundle formed from carbon fibers having the sizing agent attached thereto, the carbon fibers having been treated with the aqueous dispersion of the sizing agent for carbon fiber, wherein the amount of applied sizing agent is from 0.6% by mass to 3.0% by mass.

In addition, according to the present invention, there are provided a sheet-like article comprising the carbon fiber bundle, a composite material including this sheet-like article, and a pultrusion molding composite material containing the carbon fiber bundle.

Effect of the Invention

According to the present invention, there are provided a sizing agent for carbon fiber capable of producing a carbon fiber bundle which has excellent passability to a sizing treatment process, allows a sizing agent to be uniformly attached thereto, and also has excellent mechanical property enhancing effect when the carbon fiber bundle is compositized using a resin, particularly a radical polymerization type resin; and an aqueous dispersion of the sizing agent. Furthermore, there are provided a carbon fiber bundle having an excellent effect for enhancing the mechanical properties of a composite material; a sheet-like article comprising the carbon fiber bundle; and a carbon fiber-reinforced composite material, particularly a pultrusion molding composite material, having excellent mechanical properties.

According to the present invention, as a result of effects that as the shape of a carbon fiber bundle is fixed, the straightness retention of the carbon fiber bundle is more easily maintained, and accordingly, optimization of resin pick-up in the resin impregnation process for pultrusion molded or filament winding molding is facilitated; that stabilization of the tow shape after a resin is impregnated is markedly enhanced; and that loss of shape or stitch slipping of the fabric in hand lay-up molding does not easily occur, a carbon fiber bundle with markedly enhanced strength manifestability of molded products, and a sheet-like article comprising the carbon fibers can be obtained.

BRIEF DESCRIPTION OF DRAWINGS

FIG. 1 is a diagram for illustrating the molding processing for producing a pultrusion molding composite material from carbon fiber bundles.

BEST MODE(S) FOR CARRYING OUT THE INVENTION

<Sizing Agent for Carbon Fiber>

The sizing agent for carbon fiber of the present invention contains the components of (A) to (C) that will be described in detail below. This sizing agent can be obtained by appropriately mixing the various components.

Component (A): Compound (A) having at least one epoxy group in the molecule, which is an ester between an epoxy compound having plural epoxy groups in the molecule and an unsaturated monobasic acid The component (A) that is included in the sizing agent for carbon fiber of the present invention needs to have at least one epoxy group in the molecule. Meanwhile, an epoxy group means a group having, in its structure, a 3-membered ring with a ring skeleton composed of two carbon atoms and one carbon atoms.

(Compound (A) Having at Least One Epoxy Group in Molecule)

Examples of the epoxy group contained in the component (A) that is included in the sizing agent for carbon atom of the present invention, include a group represented by the following formula (e1), a group represented by the following formula (e2), and other cyclic aliphatic epoxy groups. The other cyclic aliphatic epoxy groups may be groups each having, in its structure, a cyclic structure formed from the 3-membered ring and a monocyclic or polycyclic aliphatic ring, and examples thereof include groups represented by, for example, the following formulas (e3) to (e5):

[Chemical Formula 1]

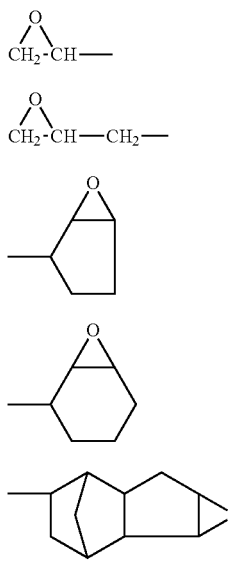

(Epoxy Compound Having Plural Epoxy Groups in Molecule)

In regard to the component (A) that is included in the sizing agent for carbon fiber of the present invention, the epoxy compound having plural epoxy groups in the molecule that forms an ester is not particularly limited, and examples include epoxy compounds of bisphenols, alkylene oxide-added epoxy compounds of bisphenols, epoxy compounds of hydrogenated bisphenols, and alkylene oxide-added epoxy compounds of hydrogenated bisphenols. These bisphenols are not particularly limited, and examples include bisphenol F type, bisphenol A type, and bisphenol S type compounds. In addition to the epoxy compounds of bisphenols, epoxy resins of phenol novolac type, cresol novolac type, diphenyl type, dicyclopentadiene type, naphthalene skeleton type, and the like can also be used. Furthermore, epoxy compounds having a straight-chained aliphatic skeleton may also be used.

(Unsaturated Monobasic Acid)

In regard to the component (A) that is included in the sizing agent for carbon fiber of the present invention, the unsaturated monobasic acid that forms an ester is not particularly limited, and any compound having one unsaturated group and one carboxyl group may be used. There are no particular limitations on the unsaturated group, but from the viewpoints of being not bulky, and preventing a decrease in stiffness of the main chain of the ester to be formed, a vinyl group or a propenyl group is preferred, and a vinyl group is more preferred. Particularly preferred is acrylic acid or methacrylic acid. That is, the component (A) is preferably an ester of the epoxy compound and acrylic acid or methacrylic acid.

The component (A) that is included in the sizing agent for carbon fiber of the present invention is an ester obtainable by allowing a compound having plural epoxy groups to react with an unsaturated monobasic acid, and in this reaction, at least one epoxy group among the epoxy groups of the compound having plural epoxy groups remains unreacted, at least one epoxy group is ring-opened by the unsaturated monobasic acid, and thus a so-called half ester having an unsaturated group is formed. Such component (A) has, in the molecule, an epoxy group derived from a compound having plural epoxy groups and an unsaturated group derived from an unsaturated monobasic acid (for example, $CH_2=CH-COO-$ derived from acrylic acid), and thereby the component (A) exhibits a coupling function between the carbon fiber surface and the resin molecules, and greatly improves the interfacial adhesiveness between the carbon fibers and the resin. Particularly, the component (A) can strongly bond a radical polymerization type resin such as an unsaturated polyester resin, a vinyl ester resin or an acrylic resin with carbon fibers, and thus can exhibit excellent interfacial adhesiveness.

Particularly, from the viewpoint of having excellent ability to exhibit interfacial adhesiveness, a compound which is an ester between a compound having an epoxy group at either end of the molecule and an unsaturated monobasic acid, and has an unsaturated group at one of the ends of the molecular main chain while having an epoxy group at the other end, is preferred. When such a compound is used as the component (A), the compound can strongly bond a radical polymerization type resin and carbon fibers, and thus can exhibit excellent interfacial adhesiveness. As this compound having an epoxy group at either end of the molecule, particularly any one or both of a diepoxy compound of a bisphenol compound and an alkylene oxide-added diepoxy compound of a bisphenol compound are preferred. That is, the component (A) is preferably a compound which is an ester between an unsaturated monobasic acid and any one or both of a diepoxy compound of a bisphenol compound and an alkylene oxide-added diepoxy compound of a bisphenol compound, and has an unsaturated group at any one end of the molecular main chain while having an epoxy group at the other end. According to the present invention, the component (A) is such that one kind may be used alone, or two or more kinds may be used in combination.

Component (B): Bifunctional Type Urethane Acrylate Oligomer (B)

The component (B) that is included in the sizing agent for carbon fiber of the present invention has an effect of forming an interfacial phase having excellent flexibility, at the interface between a matrix resin and carbon fibers. Thereby, the interfacial adhesiveness between the matrix resin and the carbon fibers is enhanced. Furthermore, when a radical polymerization type resin such as a vinyl ester resin or an unsaturated polyester resin is used as the matrix resin for a fiber-reinforced composite material, since many of those resins have low toughness, the interfacial adhesiveness is drastically increased as a result of increased toughness that is attributable to flexibilization of the interfacial phase.

Furthermore, at the time of compositizing carbon fibers having a sizing agent attached thereto with a matrix resin, the sizing agent component at the carbon fiber surfaces diffuses into the matrix resin, and a region containing the sizing agent component at a high concentration is formed particularly in the matrix resin in the vicinity of the interface. This region affects the mechanical characteristics of the composite material. Since the component (B) is an acrylate oligomer, when a fiber-reinforced composite material is formed, the component (B) is incorporated into the curing reaction of the matrix resin, and thus, integration between the interfacial phase and the matrix resin phase can be promoted. Accordingly, as the sizing agent contains this component (B), even in the case of using a radical polymerization type resin as the matrix resin, the mechanical characteristics of the fiber-reinforced composite material can be enhanced to a level equivalent to that in the case of using an epoxy resin as the matrix resin.

The component (B) that is included in the sizing agent for carbon fiber of the present invention needs to be such that the tensile elongation of a cured product as determined by the following measurement method is 40% or higher. From the viewpoint of having an excellent effect of increasing toughness of the interfacial phase, this tensile elongation is more preferably 45% or higher, and even more preferably 50% or higher. In consideration of a significant decrease in the elastic modulus of the resin near the interface, the upper limit of the tensile elongation (%) is preferably 900% or lower, and more preferably 700% or lower.

Furthermore, the component (B) that is included in the sizing agent for carbon fiber of the present invention needs to be bifunctional. If the component (B) is trifunctional or higher-functional, the crosslinking density becomes excessively high, and sufficient increase in toughness is not exhibited. On the other hand, if the component (B) is a monofunctional type compound, the crosslinking reaction with the matrix resin occurs only on one side, and a sufficient effect of increase in toughness cannot be obtained.

Furthermore, from the viewpoint of having a high effect of increasing toughness of the interfacial phase, a compound having a viscosity at 60° C. of 5,000 mPa·s or more and a tensile strength of the cured product of 6 MPa or more is preferred. A large value of viscosity indicates that the molecular weight of the oligomer is large, or the cohesive force between the oligomer molecules is large. If the molecular weight is large, or if the intermolecular cohesive force is large, the component (B) is unevenly distributed in the interfacial phase between the carbon fiber surface and the matrix resin, without diffusing into the matrix resin, and as a result, effective softening of the interfacial phase can be achieved, which is preferable. Meanwhile, the tensile strength and tensile elongation of a cured product can be determined by the following method.

A mixture of 97 g of a urethane acrylate oligomer (B) and 3 g of a curing agent (2-hydroxy-2-methyl-1-phenylpropan-1-one) is applied on a glass substrate, and thus a coating film having a thickness of 100 μm is obtained. The coating film is cured by irradiating the film with ultraviolet radiation for 5 seconds from a position 10 cm away from the coating film, using an ozone type lamp (80 W/cm).

Using the cured coating film, the tensile strength and tensile elongation are measured according to JIS K7127 (specimen type 5) at a tensile rate of 300 mm/min.

The viscosity at 60° C. of the component (B) is more preferably 10,000 mPa·s or more, and even more preferably 20,000 mPa·s or more. Regarding the upper limit of the viscosity, it is excellent if the component (B) is not in a solid state at 60° C., from the viewpoints of preparation of the sizing agent and the stability over time of the sizing agent. Meanwhile, the viscosity of the component (B can be measured using a B type viscometer.

The glass transition temperature (Tg) of a cured product of the component (B) that is included in the sizing agent for carbon fiber of the present invention is preferably −5° C. or higher, and more preferably 5° C. or higher. When the Tg of the cured product is −5° C. or higher, appropriate softening can be promoted by the interfacial phase, and also, the value of stress to breakage also increases. Therefore, a stronger interfacial phase can be formed, and the above-described effect is enhanced. That is, the interfacial phase has a function of supporting reinforcing fibers, and it becomes easy to maintain the mechanical characteristics of the composite material satisfactory by appropriately suppressing softening. In consideration of the functions as a softening component, the upper limit of Tg of the cured product is preferably 100° C. or lower, and more preferably 80° C. or lower.

(Measurement of Tg of Cured Product of Urethane Acrylate Oligomer)

The Tg of a cured product can be determined by using a cured coating film obtained by the same method as that used for the measurement of tensile elongation, and using a viscoelasticity analyzer (manufactured by UBM Co., Ltd., product name: RHEOGEL E4000), increasing the temperature at a rate of 2° C./minute, and measuring the dynamic viscoelasticity and loss tangent of the specimen, and the Tg can be determined from the peak temperature of the loss tangent (tan δ MAX).

According to the present invention, the "urethane acrylate oligomer" is a compound having a urethane bond and an acryloyl group ($CH_2=CH-CO-$) in the molecule. The structures of the urethane acrylate oligomer can be roughly classified into an aromatic structure system having an aromatic group in the structure, and an aliphatic structure system having no aromatic group. The structure of the urethane acrylate oligomer that is used in the present invention is not particularly limited, and the structure may be an aromatic system or an aliphatic system. From the viewpoint of having a satisfactory balance between the tensile elongation and the tensile strength of the cured product, an aliphatic structure system is preferred.

Regarding the component (B) that is included in the sizing agent for carbon fiber of the present invention, a commercially available urethane acrylate oligomer may be utilized, and examples of such a urethane acrylate oligomer include CN-965, CN-981, CN-9178, CN-9788, CN-9893, CN-971, CN-973 and CN-9782 manufactured by Sartomer USA, LLC; UF-8001 manufactured by Kyoeisha Chemical Co., Ltd.; and UA-122P manufactured by Shin-Nakamura Chemical Co., Ltd. (all product names). According to the present invention, regarding the component (B), one kind may be used alone, or two or more kinds may be used in combination.

[Contents of Component (A) and Component (B)]

In regard to the sizing agent of the present invention, it is necessary that the ratio of contents (mass ratio) of the component (A) and the component (B) be in the range of component (B)/component (A)=1/3 to 2/1.

If the content of the component (B) is less than 1/3 of the content of the component (A), softening of the interfacial phase and the increase of toughness occur insufficiently, and if the content is more than 2/1, the effect of exhibiting satisfactory adhesiveness, which is a function of the component (A), is inhibited, and the effect of enhancing adhesiveness to the matrix resin cannot be sufficiently obtained.

The ratio of contents of the component (A) and the component (B) is preferably such that component (B)/component (A)=1/2 to 3/2, and more preferably 2/3 to 1/1.

Furthermore, in regard to the sizing agent of the present invention, it is necessary that the proportion of the total amounts of the component (A) and the component (B) in all of the sizing components be 20% by mass or more. If the proportion is less than 20% by mass, the functions of these two components are not sufficiently exhibited, and the effects of the present invention cannot be obtained.

Here, the term "all the sizing components" means the total amount of all the components that are applied to carbon fibers after the sizing treatment, among the components that are included in the sizing agent, and means active ingredients not including those components that are removed after sizing, such as water or organic solvents for example. That is, the term "all the sizing components" can be determined as the total amount of the component (A) and component (B) described above, component (C) that will be described below, and component (D), component E) and other components that will be described below as optional components.

The proportion of the total amount of the component (A) and the component (B) is preferably 25% by mass or more, and more preferably 30% by mass or more, in all of the sizing components.

Component (C): Polyurethane Resin (C)

The sizing agent for carbon fiber of the present invention contains component (C) as an essential component. The component (C) is a polyurethane resin, and the shape of the carbon fiber bundle can be easily fixed by this component. Since the shape of the carbon fiber bundle is fixed, and thereby the straightness retention properties can be easily maintained, as a result of the effects that optimization of resin pick-up in the resin impregnation process for pultrusion molded or filament winding molding is facilitated; that stabilization of the tow shape after a resin is impregnated is markedly enhanced; and that loss of shape or stitch slipping of the fabric does not easily occur, the orientation disorder or tortuosity of the carbon fiber filaments in a molded product is suppressed, and strength manifestability of the molded product can be markedly enhanced. Furthermore, the component (C) has an effect of forming a flexible and tough interfacial phase at the interface between the matrix resin and the carbon fibers, similarly to the component (B) described above.

Regarding the component (C), one kind may be used alone, or two or more kinds may be used in combination.

The component (C) that is included in the sizing agent for carbon fiber of the present invention needs to be such that the tensile elongation of a dried coating film is from 350% to 900%. When the tensile elongation of a dried coating film is in this range, the effect of fixing the shape of the carbon fiber bundle described above and thereby maintaining the straightness retention properties can be sufficiently obtained, and also, a tough interfacial phase can be formed at the interface between the matrix resin and the carbon fibers. Furthermore, when the tensile elongation is in this range, the effect of fixing the shape of the carbon fiber bundle described above and thereby maintaining the straightness retention properties can be sufficiently easily obtained, and the convergence properties of the carbon fiber bundle are maintained during the period between the sizing treatment process and the winding process for the carbon fiber bundle, or during a processing treatment such as a weaving process. As a result, orientation disorder or tortuosity of the carbon fiber filaments can be easily suppressed, and satisfactory process passability can be easily obtained. From the viewpoints described above, the component (C) is such that the tensile elongation of the dried coating film is more preferably from 420% to 750%, and the tensile elongation is even more preferably from 450% to 650%.

The component (C) that is included in the sizing agent for carbon fiber of the present invention is preferably such that the tensile strength of a dried coating film is from 10 MPa to 50 MPa. When the tensile strength is 10 MPa or more, the effect of fixing the shape of the carbon fiber bundle described above and thereby maintaining the straightness retention properties can be easily obtained, and a tough interfacial phase can be easily formed at the interface between the matrix resin and the carbon fibers. On the other hand, when the tensile strength is 50 MPa or less, irregular attachment of the sizing agent at the carbon fiber surface does not easily occur, and satisfactory process passability can be easily obtained for the winding process or molding processing process for the carbon fiber after a sizing treatment. The tensile strength of a dried coating film of the component (C) is more preferably from 15 MPa to 40 MPa, and even more preferably from 20 MPa to 35 MPa. Meanwhile, the tensile elongation of a dried coating film can be determined by, for example, the following method.

A polyurethane resin is applied on a glass plate, and regarding the conditions for coating film preparation, the applied polyurethane resin is preliminarily dried at room temperature for 15 hours and is heated for 6 hours at 80° C. as main drying. Thereafter, the polyurethane resin is further subjected to a heating treatment a 120° C. for 20 minutes, and thus a coating film having a thickness of 500 μm is obtained. Then, the tensile strength and the tensile elongation are measured according to JIS K7127 at a tensile rate of 300 mm/min.

The component (C) that is included in the sizing agent for carbon fiber of the present invention is preferably such that the glass transition temperature (Tg) is from −50° C. to 35° C. When the glass transition temperature is −50° C. or higher, the effect of fixing the shape of the carbon fiber bundle as described above can be easily obtained, and a tough interfacial phase can be easily formed at the interface between the matrix resin and the carbon fibers. On the other hand, when the glass transition temperature is 35° C. or lower, irregular attachment of the sizing agent at the carbon fiber surface does not easily occur, and satisfactory process passability can be easily obtained for the winding process or molding processing process for the carbon fibers after a sizing treatment. The Tg of a dried coating film of the component (C) is preferably from −35° C. to 30° C., and more preferably from −20° C. to 20° C. Meanwhile, the Tg of the component (C) can be measured using a dynamic viscoelasticity analyzer.

In the sizing agent for carbon fiber of the present invention, the proportion of the component (C) in all of the sizing components is from 5% by mass to 50% by mass. When the proportion is 5% by mass or more, the effect of fixing the shape of the carbon fiber bundle as described above can be easily obtained. When the proportion is 50% by mass or less, shape fixation of the carbon fiber bundle by the component (C) can be satisfactorily achieved, and satisfactory handleability and pregnability of the matrix resin can be easily obtained. The proportion of the component (C) in all of the sizing components is preferably from 10% by mass to 45% by mass, and more preferably from 15% by mass to 40% by mass.

Component E: Ester Compound (E) being an Ester Between an Alkylene Oxide Adduct of a Bisphenol Compound and a Dicarboxylic Acid Compound and Having Acid Value of 50 or More The sizing agent for carbon fiber of the present invention preferably further contains a component (E) in addition to the component (A), component (B) and component (C) described above.

The ester between an alkylene oxide adduct of a bisphenol compound and a dicarboxylic acid compound (having an acid value of 50 or more), which can be added to the sizing agent for carbon fiber of the present invention, preferably contains a compound having a molecular weight of about 1000 and having a carboxyl group at either end of the molecule, as a main constituent component. Such a component (E) exhibits excellent compatibility with a matrix resin, particularly an epoxy resin or a vinyl ester resin. Therefore, wettability of the sizing-treated carbon fiber to the resin is increased, and resin impregnating ability is further enhanced.

The "alkylene oxide adduct of a bisphenol compound" that forms the component (E) that can be added to the sizing agent for carbon fiber of the present invention is preferably a compound obtained by adding 2 to 4 moles of ethylene oxide or propylene oxide to 1 mole of a bisphenol compound. When the amount of addition of ethylene oxide or propylene oxide is 4 moles or less relative to 1 mole of the bisphenol compound, it is easy to make the affinity with the matrix resin satisfactory, without impairing the rigidity of the molecular chain originally exhibited by the bisphenol compound. More preferred is a compound obtained by adding 2 moles of ethylene oxide or propylene oxide to a bisphenol compound. The alkylene oxide adduct of a bisphenol compound may be used singly, or mixtures of plural compounds may also be used.

The "dicarboxylic acid compound" that forms an ester with an alkylene oxide adduct of a bisphenol compound is preferably an aliphatic compound having 4 to 6 carbon atoms. When an aromatic compound is used as the dicarboxylic acid compound, the resulting ester compound tends to have a relatively high melting point and relatively inferior dissolubility in the matrix resin. Therefore, as compared with an aromatic compound, an aliphatic compound is preferred from the viewpoint of exhibiting satisfactory wettability. On the other hand, when an aliphatic compound having 6 or less carbon atoms is used as the dicarboxylic acid compound, it is easy to make the affinity with the matrix resin satisfactory, without impairing the rigidity of the resulting ester compound.

Examples of the dicarboxylic acid compound include fumaric acid, maleic acid, methylfumaric acid, methylmaleic acid, ethylfumaric acid, ethylmaleic acid, glutaconic acid, itaconic acid, malonic acid, succinic acid, methylsuccinic acid, glutaric acid, and adipic acid.

The component (E) that can be added to the sizing agent for carbon fiber of the present invention may be used singly, or two or more kinds may be used in combination. According to the present invention, the content of the component (E) is preferably 2.0 times by mass or less relative to the total amount of the component (A) and the component (B). When this ratio is two times or less, the interaction between the component (A) and the carbon fiber surface being inhibited by the interaction between the epoxy group of the component (A) and the acidic group (carboxyl group or the like) of the component (E) can be easily prevented. As a result, the coupling function of the component (A) between the carbon fibers and the matrix resin is easily exhibited, and it is easy to make the adhesiveness satisfactory. This ratio is more preferably 1.75 or less, and most preferably 1.55 or less. The lower limit of this ratio is not particularly limited, but in order to exhibit the effect of the component (E) that increases the wettability to a resin and resin impregnating ability of the sizing-treated carbon fibers, the lower limit is preferably 0.2 or greater, and more preferably 0.4 or greater.

Component (D): Surfactant (D)

The sizing agent of the present invention preferably further contains a component (D).

The component (D) that is included in the sizing agent for carbon fibers of the present invention is used to disperse the component (A), component (B) and component (C) described above, the component (E) as an optional component, and other components in water. Regarding the component (D), one kind may be used alone, or two or more kinds may be used in combination.

Examples of the component (D) that is included in the sizing agent for carbon fibers of the present invention include a nonionic surfactant and an anionic surfactant. Examples of the nonionic surfactant that can be utilized include aliphatic nonionic surfactant and phenolic nonionic surfactants. Examples of the aliphatic nonionic surfactants include higher alcohol ethylene oxide adducts, fatty acid ethylene oxide adducts, polyhydric alcohol fatty acid ester ethylene oxide adducts, fatty acid esters of glycerol, fatty acid esters of sorbitol and sorbitan, and fatty acid esters of pentaerythritol. Examples of the phenolic nonionic surfactants include alkylphenolic nonionic surfactants and polycyclic phenolic nonionic surfactants.

Furthermore, regarding the ethylene oxide adduct, a compound obtained by incorporating propylene oxide units to some parts in a polyethylene oxide chain in a random or block fashion is suitable.

Regarding the fatty acid ethylene oxide adduct or the polyhydric alcohol fatty acid ester ethylene oxide adduct, nonionic surfactants of monoester type, diester type, triester type, tetraester type and the like can be used.

It is preferable that an anionic surfactant (D-1) component having an ammonium ion as a counterion and a nonionic surfactant (D-2) component that will be described below be incorporated simultaneously as the component (D) that is included in the sizing agent for carbon fiber of the present invention.

The anionic surfactant (D-1) component having an ammonium ion as a counterion enhances the stability at the time of preparing the sizing agent for carbon fiber of the present invention in an aqueous dispersion, and wettability of the carbon fiber surface to a resin, by having a hydrophobic group and an ammonium ion as a counterion. Furthermore, the component (D-2) has an effect of suppressing the reaction activity between the ammonium ion of the component (D-1) and the epoxy group of the component (A). Therefore, when the sizing agent contains appropriate amounts of the component (D-1) and the component (D-2) (regarding the contents, detailed description will be given below), impregnating ability of various matrix resins is further enhanced, and the change over time of hardness of the sizing agent-treated carbon fibers can be reduced to a very low level.

The component (D-1) is not particularly limited, and examples include carboxylates, sulfuric acid ester salts, sulfonic acid salts, and phosphoric acid ester salts. Among these, sulfuric acid ester salts and sulfonic acid salts have especially excellent ability of emulsifying the component (A) or the component (B), and thus it is more preferable.

Examples of the sulfuric acid ester salts include higher alcohol sulfuric acid ester salts, higher alkyl polyethylene glycol ether sulfuric acid ester salts, alkylbenzene polyethylene glycol ether sulfuric acid ester salts, polycyclic phenyl ether polyethylene glycol ether sulfuric acid ester salts, and sulfated fatty acid ester salts. Furthermore, compounds containing propylene oxide units in some parts in the polyethylene oxide chains of higher alkyl polyethylene glycol ether sulfuric acid ester salts, alkylbenzene polyethylene glycol ether sulfuric acid ester salts, and polycyclic phenyl ether polyethylene glycol ether sulfuric acid ester salts, in a random or block fashion, can also be used.

Examples of the sulfonic acid salts include alkylbenzene sulfonic acid salts, alkylnaphthalene sulfonic acid salts, polycyclic phenyl ether sulfonic acid salts, alkylsulfonic acid salts, α-olefin sulfonic acid salts, α-sulfonated fatty acid salts, and dialkylsulfosuccinic acid salts.

Particularly, an anionic surfactant having a hydrophobic group represented by the following formula (1) or (2) is more preferably used as the component (D-1).

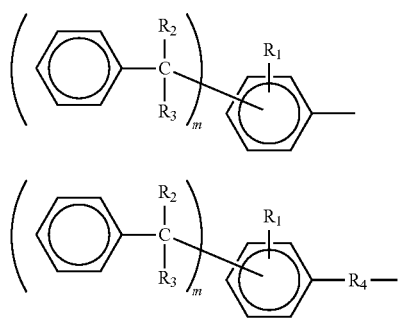

For a carbon fiber-reinforced composite material, it is preferable that the material exhibit excellent mechanical properties by compositization of carbon fibers and a matrix resin. Therefore, a compound having an aromatic skeleton is mainly used as the matrix resin from the viewpoint of rigidity, and thus, in many cases, a compound having an aromatic skeleton is used as a main component in the sizing agent for carbon fiber. Since the hydrophobic group represented by formula (1) or (2) has high affinity with aromatic substances, when an anionic surfactant having a hydrophobic represented by formula (1) or (2) is incorporated in the sizing agent for carbon fiber as the component (D-1), the emulsified state is stabilized, and storability and satisfactory results are obtained the production process at the time of carbon fiber production are obtained. Also, compatibility between the sizing agent and the matrix resin is enhanced, and the effects of the present invention, particularly the mechanical properties enhancing effects are further enhanced.

Furthermore, from the viewpoint of preventing diffusion of exogenous endocrine disruptor derivatives, the anionic surfactant having a hydrophobic group represented by formula (1) or (2) is also preferred from the viewpoint that it is desirable to avoid using an anionic surfactant having a phenol group having a relatively long alkyl group, such as a nonylphenol-based or octylphenol-based surfactant.

In formulas (1) and (2), $R_1$ represents a hydrogen atom or a monovalent chain-like hydrocarbon group having 1 to 3 carbon atoms, and a hydrogen atom or an alkyl group having 1 to 3 carbon atoms is preferred, while a hydrogen atom or a methyl group is more preferred. From the viewpoint of exogenous endocrine disruptor derivatives, a hydrogen atom is more preferred. $R_2$ and $R_3$ each represent a hydrogen atom or a monovalent chain-like hydrocarbon group having 1 to 3 carbon atoms, and $R_2$ and $R_3$ may be identical with or different from each other. Examples of the chain-like hydrocarbon group for $R_2$ and $R_3$ include the same hydrocarbon groups as the chain-like hydrocarbon groups for $R_1$. $R_4$ represents a divalent aliphatic hydrocarbon group, and examples include a linear or branched alkylene group having 1 to 10 carbon atoms. m represents a positive integer, and is preferably an integer from 1 to 3, and more preferably 1 or 2. When m is 3 or less, the hydrophobic group itself acquiring a bulky structure can be easily prevented, and thus, affinity and compatibility with the component (A) or component (B) and the matrix resin can be easily improved. As a result, it is easy to ameliorate stability of emulsification, resin impregnating ability, and mechanical properties of the fiber-reinforced composite material. The group indicated inside brackets that are assigned with subscript m is preferably a benzyl group (a group in which both $R_2$ and $R_3$ are hydrogen atoms) or a styrene group (a group in which any one of $R_2$ and $R_3$ is a hydrogen atom, and the other is a methyl group), from the viewpoint of the bulkiness of the molecule of the hydrophobic group moiety. Furthermore, when m is 2 or greater, that is, when the group inside the brackets assigned with subscript m is present in a plural number, those groups may be identical with or different from each other.

Furthermore, a commercially available product can be used as the component (D) or the component (D-1). Examples of the nonionic surfactants include "NEWCOL 707", "NEWCOL 723", and "NEWCOL 707-F" manufactured by Nippon Nyukazai Co., Ltd. Examples of the anionic surfactants (component (D-1) include "NEWCOL 707-SF" and "NEWCOL 723-SF" manufactured by Nippon Nyukazai Co., Ltd.; "HITENOL NF-13" and "HITENOL NF-17" manufactured by Dai-ichi Kogyo Seiyaku Co., Ltd. (all product names).

The component (D-2) is not particularly limited, but particularly, an aliphatic nonionic surfactant is preferred from the viewpoint of having a very excellent reaction activity decreasing action. Examples of the aliphatic nonionic surfactant include higher alcohol ethylene oxide adducts, fatty acid ethylene oxide adducts, polyhydric alcohol fatty acid ester ethylene oxide adducts, fatty acid esters of glycerol, fatty acid esters of sorbitol and sorbitan, and fatty acid esters of pentaerythritol. Regarding these ethylene oxide adducts, compounds obtained by incorporating propylene oxide units into some parts of the polyethylene oxide chain in a random or block fashion are also suitably used.

Regarding the higher alcohol ethylene oxide adducts, fatty acid ethylene oxide adducts, and polyhydric alcohol fatty acid ester ethylene oxide adducts, compounds containing propylene oxide units in some parts of the polyethylene oxide chains in a random or block fashion are more preferred. It is because these compounds have an excellent ability of decreasing the reaction activity for the epoxy group of ammonium ion. Regarding the fatty acid exthylene oxide adducts and polyhydric alcohol fatty acid ester ethylene oxide adducts, compounds of monoester type, diester type, triester type or tetraester type can also be utilized.

Furthermore, also for the component (D-2), commercially available products can be used, and examples include "FINESURF FON 180E07 (product name)" manufactured by Aoki Oil Industrial Co., Ltd.

The content of the component (D) can be appropriately determined by considering the stability of the aqueous dispersion in which the sizing agent is dispersed in water, or the sizing effect of the sizing agent; however, as a reference, the content is preferably 5% to 30% by mass, and more preferably 10% to 25% by mass, relative to 100% by mass of the sizing agent. When the content of the surfactant is 5% by mass or more, the stability of the aqueous dispersion in which the sizing agent is dispersed in water can be easily made satisfactory, and when the content is 30% by mass or less, it is easy to manifest the effect of the sizing agent.

(Contents of Component (D-1) and Component (D-2))

When the sizing agent of the present invention contains the component (D-1) and the component (D-2), the ratio of contents of the component (D-1) and the component (D-2) (mass ratio) is preferably in the range of component (D-2)/component (D-1)=1/10 to 1/5.

When this ratio is in this range, the reaction activity of ammonium ion derived from the component (D) directed to the epoxy group of the component (A) can be easily suppressed, and the change over time in the hardness of the carbon fibers having a sizing agent attached thereto can be markedly suppressed. Furthermore, since the stability of emulsification when the sizing agent is emulsified using water or the like as a medium, or wettability of the sizing-treated carbon fiber surface to resins is enhanced, which is preferable.

Furthermore, in regard to the sizing agent of the present invention, when the sizing agent contains the component (D-1) and the component (D-2), the proportion of the total amount of the component (D-1) and the component (D-2) in all of the sizing components is preferably 10% to 25% by mass. When the proportion is in this range, the stability of emulsification of the sizing agent liquid is very satisfactory, and it is easy to exhibit the effect of the sizing agent. A more preferred lower limit of the total amount of the component (D-1) and the component (D-2) is 13% by mass, and a more preferred upper limit is 20% by mass.

<Aqueous Dispersion of Sizing Agent for Carbon Fiber>

The aqueous dispersion of the sizing agent for carbon fiber of the present invention is obtained as an aqueous dispersion of one sizing agent for carbon fiber by mixing and stirring (emulsifying and dispersing in water) various components by a conventional method, or one aqueous dispersion can also be obtained by mixing plural aqueous dispersion that have been separately treated.

Furthermore, there is no problem if the sizing agent concentration (concentration of non-volatile components) in the aqueous dispersion of the sizing agent for carbon fiber of the present invention, that is, the concentration of components other than the volatile components (water and the like that are removed by drying after sizing) in the aqueous dispersion for sizing, is in the concentration range in which water exists as a continuous phase, and the concentration is usually adjusted to be a concentration of about 10% to 50% by mass. There is no problem if the concentration is adjusted to be less than 10% by mass in the stage of preparing the aqueous dispersion for sizing; however, as the proportion of water in the aqueous dispersion for sizing is increased, it may be economically inefficient in terms of transport and storage during the period from the preparation of the aqueous dispersion for sizing to the use (sizing treatment carbon fibers). Therefore, on the occasion of using the aqueous dispersion for sizing (sizing treatment of carbon fibers), a method of diluting the aqueous dispersion for sizing in a low-concentration aqueous liquid at about 0.1% to 10% by mass such that a desired amount of sizing agent attachment would be obtained, and attaching the sizing agent to carbon fibers, is generally used.

The volume-based average particle size of the dispersed particles in the aqueous dispersion of the sizing agent for carbon fiber of the present invention is preferably set to 0.3 µm or less. When the average particle size is 0.3 µm or less, the storage stability of the aqueous dispersion o the sizing agent for carbon fiber and the stability over time of the aqueous dispersion of the sizing agent for carbon fiber can be easily secured. Furthermore, since the occurrence of irregular attachment of the sizing agent at the carbon fiber surface can be easily prevented, and it is easy to maintain scratch resistance of carbon fibers at a satisfactory level, the occurrence of fuzzing during the winding process or molding processing process of carbon fibers after a sizing treatment can be easily prevented, which is preferable. Meanwhile, the lower limit of the average particle size is not particularly limited. Meanwhile, the average particle size is measured using, for example, a laser diffraction/scattering type particle size distribution analyzer.

Furthermore, this sizing agent may also be dispersed in a solvent.

(Aqueous Dispersion of Polyurethane Component (C))

When an aqueous dispersion prepared with a polyurethane resin is used as the component (C), the volume-based average particle size of the dispersion particles of the polyurethane resin is preferably adjusted to 0.2 µm or less. When the volume-based average particle size of the dispersed particles of the polyurethane resin is 0.2 µm or less, since the occurrence of irregular attachment of the sizing agent at the carbon fiber surface can be easily prevented, and it is easy to maintain scratch resistance of the carbon fibers at a satisfactory level, the occurrence of fuzzing in the winding process or molding processing process of carbon fibers after a sizing treatment can be easily prevented, which is preferable. Meanwhile, the lower limit of the average particle size is not particularly limited. Meanwhile, the average particle size is measured using, for example, a laser diffraction/scattering type particle size distribution analyzer.

Regarding the polyurethane resin used in the aqueous dispersion of the polyurethane component (C), many products of urethane resins prepared in the form of aqueous dispersion are commercially available from various manufacturers, and as described above, a product in which a polyurethane which produces a dried coating film having a tensile elongation of from 350% to 900% is dispersed in water, and the volume-based average particle size of the particles of the polyurethane resin in the aqueous dispersion is 0.2 μm or less, can be selected. Examples include "U-COAT UWS-145" manufactured by Sanyo Chemical Industries, Ltd.; "KP-2820" manufactured by Matsumoto Yushi Seiyaku Co., Ltd.; "SUPERFLEX 150HS" and "SUPERFLEX 470" manufactured by Dai-ichi Kogyo Seiyaku Co., Ltd. (all product names). Furthermore, examples of a polyurethane resin dispersion liquid that produces a dried coating film having a tensile elongation in the range described above, include "PERMALIN UA-368" manufactured by Sanyo Chemical Industries, Ltd.

<Carbon Fiber Bundle Having Sizing Agent for Carbon Fiber Attached Thereto (Sizing-Treated Carbon Fiber)

The carbon fiber bundle that can be suitably used for the carbon fiber bundle having the sizing agent for carbon fiber of the present invention attached thereto, may be obtained by any of raw materials such as pitch, rayon and polyacrylonitrile, and may be any of high strength type (low elastic modulus carbon fiber), medium-high elasticity carbon fiber, and ultrahigh elasticity carbon fiber. The method for attaching the sizing agent for carbon fiber may be carried out by, for example, a roller immersion method, a method of attaching a dispersion liquid of a sizing agent to carbon fibers by a roller contact method, and drying the dispersion liquid; or a method of spraying a dispersion liquid directly on carbon fiber bundles by spraying. However, from the viewpoints of productivity and uniform attachability, a roller immersion method is preferred.

The amount of applied sizing agent in the carbon fiber bundle having the sizing agent for carbon fiber of the present invention attached thereto is preferably from 0.6% by mass to 3.0% by mass, and more preferably from 1.0% by mass to 2.4% by mass, relative to the total mass of the carbon fibers and the sizing agent. When the amount of applied sizing agent is 0.6% by mass or more, it becomes easier to cover the entire surface of the carbon fibers with the sizing agent. Furthermore, when sizing-treated carbon fibers and a matrix resin are mixed at the time of producing a carbon fiber-reinforced composite material, the function manifestability for flexibility, toughness and the like caused by the interfacial resin layer described above can be freely exhibited. On the other hand, when the amount of applied sizing agent is 3.0% by mass or less, a large amount of the sizing agent is deposited on the carbon fiber surface, and the sizing-treated carbon fibers become hard. As a result, deterioration of handleability of the sizing-treated carbon fibers or impregnating ability of the matrix resin can be easily suppressed.

Furthermore, when the amount of applied sizing agent is in the range described above, inconvenience occurs in the transfer of stress that is transferred to the sizing-treated carbon fibers from the matrix resin through an interfacial resin layer in the carbon fiber-reinforced composite material, and deterioration of mechanical characteristics can be suppressed. Furthermore, when the amount of applied sizing agent is in the range described above, excellent convergence properties and scratch resistance of the carbon fibers are obtained, and also, wettability to the matrix resin or the interfacial adhesive force between the matrix resin and the carbon fibers is sufficiently enhanced. Thus, the carbon fiber-reinforced composite material thus obtainable can have satisfactory mechanical characteristics.

Meanwhile, the convergence properties of a carbon fiber bundle change depending on the number of filaments of the carbon fibers that are treated by sizing, fiber diameter, surface creases, and the like. In the present invention, a suitable range of cantilever value can be obtained by regulating the proportions of the various components in the sizing agent, or the amount of applied sizing agent. The amount of applied sizing agent can be regulated by adjusting the sizing agent concentration of the aqueous dispersion of the sizing agent for the sizing treatment, or by adjusting the amount of throttle.

(Measurement of Amount of Attachment of Sizing Agent of Carbon Fiber Bundle Having Sizing Agent for Carbon Fiber Attached Thereto)

Carbon fiber bundles having a sizing agent for carbon fiber attached thereto are weighed (W1). In a nitrogen gas stream at 50 liters/minute, the carbon fiber bundles are left to stand for 15 minutes in a muffle furnace (FP410 manufactured by Yamato Scientific Co., Ltd.) that is set at a temperature of 450° C., and the sizing agent attached to the carbon fiber bundles is completely thermally decomposed. Then, the carbon fiber bundles are transferred to a container in a dry nitrogen gas stream at 20 liters/minute, and the carbon fiber bundles that have been cooled for 15 minutes are weighed (W2). Thus, the amount of attachment is determined from the following formula:

$$\text{Amount of attachment of sizing agent(mass \%)} = [W1(g) - W2(g)]/[W1(g)] \times 100$$

The cantilever value at 25° C. of the carbon fiber bundle hating the sizing agent for carbon fiber attached thereto is preferably from 200 mm to 400 mm. When the cantilever value at 25° C. is from 200 mm to 400 mm, even in an operation environment for various molding processing using a unidirectionally reinforced fabric formed from the carbon fiber bundles, loss of shape of the fabric does not easily occur; for example, preparation of a carbon fiber-reinforced resin composition obtainable by impregnating a unidirectionally reinforced fabric with a resin is not dependent on the operation environment; straightness of the carbon fibers is easily maintained; and the mechanical properties of a molded product obtainable from the carbon fiber-reinforced resin composition (carbon fiber-reinforced resin composite material) exhibit satisfactory mechanical characteristics. When the cantilever value is 400 mm or less, convergence properties of the carbon fiber bundle can be appropriately maintained, handleability of the carbon fiber bundle is made satisfactory, and impregnating ability of the matrix resin can be easily made satisfactory. The cantilever value at 25° C. is preferably from 220 mm to 380 mm, and more preferably from 240 mm to 360 mm.

The cantilever value at 25° C. of the carbon fiber bundle having the sizing agent for carbon fiber according to the present invention attached thereto is measured by the following method.

(Measurement of Cantilever Value of Carbon Fiber Bundle)

(Step 1) Before winding on a bobbin, carbon fiber bundles having a sizing agent attached thereto is cut to a length of about 80 cm, a weight of 0.04 g/Tex is attached to this carbon fiber bundle, and the carbon fiber bundle is suspended for one hour in an air atmosphere at 25° C. Next, both ends of this carbon fiber bundle are cut to a length of about 10 cm, and thus a carbon fiber bundle for test having a length of about 70 cm is obtained. Ten carbon fiber bundles for test are provided. At this time, the operation is carried out while being cautious not to disintegrate the shape of the carbon fiber bundles.

(Step 2) Measurement is carried out in an air atmosphere at 25° C. The carbon fiber bundle for test is mounted on the horizontal plane of a measuring stand having a horizontal plane and an inclined plane with an inclination angle of 45°, which is inclined downward from an end of the horizontal plane (linear-shaped), and an edge (linear-shaped) of the carbon fiber bundle for test is aligned with the boundary line A between the inclined plane and the horizontal plane. A loading nose plate is mounted on the carbon fiber bundle for test, and an edge (linear-shaped) of the loading nose plate is aligned with the boundary line A.

(Step 3) Next, the loading nose plate is moved in the horizontal direction facing the inclined plane at a rate of 2 cm/second, and the migration of the loading nose plate is stopped at the time point where the edge of the carbon fiber bundle for test is brought into contact with the inclined plane.

(Step 4) The migration length of the loading nose plate according to Step 3 is designated as value x.

(Step 5) Next, the positions of the front side and the back side and the two ends of the carbon fiber bundle for test are reversed, and the migration length y is obtained by the same procedure from Step 2 to Step 4.

(Step 6) The average values of the value x and the value y are defined as the cantilever value of a single carbon fiber bundle, and furthermore, the simple average values obtained by taking the number of measurements from Step 2 to Step 5 as 10 times are designated as the cantilever value.

The carbon fiber bundle having the sizing agent for carbon fiber of the present invention attached thereto is such that since the sizing agent described above has been applied, fuzzing and the like caused by mechanical friction or the like does not easily occur, and the carbon fiber bundle has excellent impregnating ability or adhesiveness of a resin. Furthermore, since the sizing agent contains the component (B) and the component (C) in addition to the component (A), when a carbon fiber-reinforced resin composition is prepared by compositizing the carbon fiber bundle having the sizing agent for carbon fiber of the present invention attached thereto with a matrix resin, the mechanical properties of a molded product (fiber-reinforced composite material) obtainable using the carbon fiber-reinforced resin composition exhibit satisfactory mechanical characteristics.

Furthermore, particularly when the sizing agent contains the component (E), the sizing agent exhibits excellent compatibility with the matrix resin. Therefore, wettability of the sizing-treated carbon fibers to a resin is enhanced, and resin impregnating ability is further enhanced.

The carbon fiber bundle having the sizing agent for carbon fiber of the present invention attached thereto has excellent process passability for weaving or the like, and can be suitably processed into a sheet-like article such as a woven fabric or a unidirectionally arranged sheet. Particularly, in regard to weaving, usually the carbon fibers are prone to fuzzing as a result of scratching; however, the carbon fiber bundle having the sizing agent for carbon fiber of the present invention attached thereto is capable of more markedly suppressing fuzzing by means of the sizing agent. Furthermore, the carbon fiber bundle is also suitable for direct molding such as pultrusion molding or filament winding molding. It is easy to make the carbon fiber bundle in the form of being converged in a tape form, and in this case, particularly, it is easy to control the pick-up amount of the resin in the process of immersing the carbon fiber bundle in a resin bath filled with a liquid resin. Thus, the removal process for excess resin in the later stages of the processing process can be simplified, disorder of the filaments in the fiber bundle can be reduced, and as a result, the mechanical performance of molded articles can be enhanced.

<Sheet-Like Article>

A sheet-like article comprising the carbon fiber bundle having the sizing agent for carbon fiber of the present invention attached thereto is characterized by using the carbon fiber bundle treated with the sizing agent described above, and examples include woven fabrics, unidirectionally arranged sheets, non-woven fabrics, mats, and combinations thereof. The sheet-like article may be formed from the carbon fiber bundle having the sizing agent for carbon fiber attached thereto, or may contain other elements.

An example of the sheet-like article of the present invention may be a unidirectional mixture of carbon fiber bundles having the sizing agent for carbon fiber of the present invention attached thereto. Examples of such a sheet-like article include an article in which the carbon fiber bundles are simply mixed in one direction at a certain interval; an article in which more weft yarns are arranged in the width direction of the sheet-like article, or the carbon fiber bundles are fixed by thermal fusion using thermally fusible fibers as the weft yarns; and a sheet-like article obtained by means of a thermally fusible web or net arranged on the surface of the sheet-like article. Particularly, in the present invention, it is preferable that the sheet-like article formed by arranging in one direction those carbon fiber bundles having the sizing agent for carbon fiber of the present invention attached thereto is such that: (a) thermally fusible fibers are arranged and thermally fused at a predetermined interval in a direction that runs straight with the carbon fibers, on at least one surface of a sheet-like article of carbon fibers that are mixed in one direction (hereinafter, referred to as sheet-like article a); or (b) a fusible textile fabric such as a net-like support or web-lie support formed from a thermoplastic resin or coated with a thermoplastic resin, is thermally fused on at least one surface of a sheet-like article of carbon fibers that are mixed in one direction (hereinafter, referred to as sheet-like article b).

(Sheet-Like Article a)

The sheet-like article a is produced by mixing carbon fiber bundles in one direction into a sheet form, arranging thermally fusible fibers in the width direction of the reinforcing fibers (carbon fibers), heating the fibers, and thermally fusing the thermally fusible fibers with the carbon fibers. The interval at which the thermally fusible fibers are arranged is preferably from 3 mm to 150 mm, and more preferably from 3 mm to 15 mm. If the interval of arrangement is 3 mm or more, satisfactory handleability of the sheet-like article is obtained, and bundling of the carbon fibers is suitably achieved so that impregnating ability of the resin can be easily made satisfactory. Furthermore, if the interval is 150 mm or less, handleability as a sheet-like article can be easily made satisfactory.

(Sheet-Like Article b)

The sheet-like article b is produced by mixing carbon fiber bundles in one direction into a sheet form, and thermally fusing a thermoplastic resin which exhibits adhesiveness by melting at a temperature higher than or equal to room temperature, or a thermally fusible textile fabric such as a net-like support or web-like support coated with a thermoplastic resin, on at least one surface of the sheet. The net mesh opening of the net-like support is preferably wide from the viewpoint of resin impregnating ability, and it is preferable that one side of the polygon of the mesh opening be 1 mm or more, and the area of a mesh opening be 10 $mm^2$ or more. It is more preferable that one side be 2.5 mm or more, and the area of a mesh opening be 15 $mm^2$ or more. On the other hand, from the viewpoints of prevention of fraying of carbon fibers and handleability at the time of cutting, it is preferable that the mesh openings be smaller, and it is preferable that one side be 20 mm or less, while the area of a mesh opening be 500 $mm^2$ or less.

The web-like support is a sheet-like article in which short fibers or long fibers are intertwined. The weight per area of the net-like or web-like support is preferably 20 g/m² or less, from the viewpoints of the mechanical characteristics of the molded product thus obtainable, particularly maintenance of interlayer shear strength, and resin impregnating ability of the sheet-like article.

(Fabric)

The sheet-like article formed from carbon fiber bundle having the sizing agent for carbon fiber of the present invention attached thereto may be a fabric obtained by using carbon fiber bundle having the sizing agent for carbon fiber of the present invention attached thereto, as the weaving yarn. The fabric may also be used for the applications of reinforcing sheet materials for bridges, bridge piers, and pillars of constructions. There are no particular limitations on the weaving texture of the fabric, and plane weave, twill, satin weave, and modifications of these original textures may all be used. Furthermore, the fabric may employ the carbon fiber bundle having the sizing agent for carbon fiber of the present invention attached thereto for both the weft and the warp, or may be a weaving mixture with other carbon fibers (bundles) or fibers (bundles) other than carbon fiber. Examples of the fibers other than carbon fiber include inorganic fibers such as glass fiber, tyranno fiber and SiC fiber, and organic fibers such as aramid, polyester, polypropylene, polyamide, acryl, polyimide and vinylon fibers.

Among them, in order to make handleability and resin impregnating ability, a fabric producing using carbon fibers (bundles) having the sizing agent for carbon fiber of the present invention as the warp, and a fiber having a tensile modulus lower than that of the warp as the weft, is preferred. When a fiber having a tensile modulus lower than that of the warp as the weft, tortuosity does not easily occur in the longitudinal direction of the warp, and when the fabric is used as a reinforcing sheet, sufficient strength can be exhibited, which is preferable.

Furthermore, the fiber other than carbon fiber may also be a composite fiber formed from two or more kinds. Particularly, a composite system formed from two or more kinds of fibers having a difference in melting point of 50° C. or more is particularly excellent. A high melting point fiber functions as an original weft, and a low melting point fiber integrates the warp and the weft after weaving and imparts excellent handleability.

The fiber other than carbon fiber is such that from the viewpoint of strength manifestability as a reinforcing sheet, the weft is preferably a fine yarn, and a yarn having a mass per meter of 0.1 g or less is desired. The interval of weft is desirably 3 mm to 15 mm. When the interval is 3 mm or more, it is easy to suppress tortuosity in the longitudinal direction of the warp, and satisfactory strength manifestability can be easily obtained. On the other hand, when the interval is 15 mm or less, it is easy to make the handleability as a sheet-like article satisfactory. A more preferred interval of the weft is from 4 mm to 10 mm.

(Carbon Fiber-Reinforced Resin Composition and Composite Material Including Sheet-Like Article)

The carbon fiber bundle having the sizing agent for carbon fiber of the present invention attached thereto, and the sheet-like article of the present invention can be compositized with a matrix resin and constitute a carbon fiber-reinforced resin composition in the form of a unidirectional prepreg, a cross prepreg, a towpreg, a filament-reinforced resin-impregnated sheet, a filament mat-reinforced resin-impregnated sheet or the like. The matrix resin is not particularly limited, but examples include an epoxy resin, a radical polymerization-based resin such as an acrylic resin, a vinyl ester resin, an unsaturated polyester resin or a thermoplastic acrylic resin, and a phenolic resin.

The carbon fiber-reinforced resin composition can be produced by impregnating the carbon fiber bundle having the sizing agent for carbon fiber of the present invention attached thereto, or the sheet-like article of the present invention, with the matrix resin described above. Regarding the method for producing such a carbon fiber-reinforced resin composition, methods that are conventionally carried out can be employed. Examples include methods such as a hot melt method, a solvent method, a syrup method, and a thickening resin method used in sheet mold compounds (SMC) and the like.

A carbon fiber-reinforced resin composition that uses the carbon fiber bundle having the sizing agent for carbon fiber of the present invention attached thereto or the sheet-like article of the present invention is such that since the sizing-treated carbon fiber is used as a reinforcing material, the carbon fiber-reinforced resin composition can be made as a composition having excellent impregnating ability with an epoxy resin, a radical polymerization-based resin such as an acrylic resin, an unsaturated polyester resin or a vinyl ester resin, a phenolic resin or the like, having strong interfacial adhesive force between the carbon fibers and the matrix resin, and exhibiting satisfactory mechanical characteristics.

<Pultrusion Molding Composite Material Containing Carbon Fiber Bundle>

A pultrusion molding composite material that uses a carbon fiber bundle having the sizing agent for carbon fiber of the present invention attached thereto, can be used as any of a rod-shaped material or a plate-shaped material. A rod-shaped material can be produced by impregnating carbon fiber bundles with a matrix resin, subsequently molding the product using a die or a mold, and then curing by heating the molded product. Also, a plate-shaped material can also be produced by impregnating carbon fiber bundles with a matrix resin, subsequently molding the product using a mold, and curing by heating the molded product. The matrix resin is not particularly limited, but examples include an epoxy resin, a radical polymerization-based resin such as an acrylic resin, a vinyl ester resin, an unsaturated polyester resin or a thermoplastic acrylic resin, and a phenolic resin.

Meanwhile, it is preferable that the pultrusion molding composite material or the composite material including a sheet-like article contain a thermosetting matrix resin. Furthermore, it is preferable that the tensile strength of the pultrusion molding composite material be from 5000 MPa to 6000 MPa.

EXAMPLES

Hereinafter, the present invention will be described in more detail by way of Examples, but the present invention is not intended to be limited by these Examples.

(Average Particle Size of Dispersed Particles in Aqueous Dispersion)

The average particle size of an aqueous dispersion of the sizing agent for carbon fiber was measured using a high concentration system particle size analyzer (manufactured by Otsuka Electronics Co., Ltd., product name: FPAR-1000).

(Sizing Treatment Process Passability)

The sizing treatment process passability was evaluated such that in the processes including from the hot air drying treatment that will be described below to the winding on a bobbin, when there was no occurrence of fuzzing, and wrapping of fibers onto the guide roller during the process did not occur, the case was rated as ◯; and when fuzzing occurred, or winding of fibers onto the guide roller during the process occurred, the case was rated as x.

(Observation of Surface State)

Furthermore, the surface state of the carbon fibers having the sizing agent for carbon fiber of the present invention attached thereto was observed using a scanning electron microscope (manufactured by JEOL, Ltd., product name: JEOL JSM-6390) at an accelerating voltage of 5 kV and a magnification ratio of 2500 times. It was evaluated such that the case where irregular attachment of the sizing agent was not observed was rated as ◯, and the case where irregular attachment of the sizing agent was observed was rated as x.

(Production of Unidirectional Sheet-Like Article)

A unidirectional sheet-like article was produced by mixing, in one direction, carbon fiber bundles having the sizing agent of the present invention attached thereto, at an interval of 2.5 mm and a width of 300 mm using a butt strap and a comb; disposing on both surfaces thereof an interlaced yarn (0.03 g/m) of a glass fiber (tensile modulus: 72.5 GPa) and a low melting point nylon fiber (multifilament, melting point: 125° C.) at an interval of 25 mm on each surface (in a sheet, the weft is disposed alternately on both surfaces at an interval of 12.5 mm); and thermally fusing the sheet-like article at 180° C. by hot pressing.

(Measurement of Bending Resistance of Unidirectional Sheet-Like Article: 45° Cantilever Method)

Bending resistance of the unidirectional sheet-like article was measured according to the bending resistance test A method (45° cantilever method) described in JIS L1096, except that five sheets of samples, each having a dimension in width (a direction perpendicular to the fiber axis direction of the carbon fiber bundle) of about 2.5 cm (so as to include six carbon fiber bundles having the sizing agent attached thereto) and a dimension in length (fiber axis direction) of about 15 cm, were collected as specimens from the unidirectional sheet-like article. Meanwhile, the measurement in the transverse direction of samples as described in the bending resistance test A method (45° cantilever method) described in JIS L1096 was not carried out.

(Production of Composite Material of Unidirectional Sheet-Like Article)

The unidirectional sheet-like article was impregnated with a mixture of an epoxy resin (manufactured by Konishi Co., Ltd., product name: E2500S) as a main agent and a curing agent mixed at a ratio of 100 parts by mass of the main agent and 50 parts by mass of the curing agent, and the resultant was cured in a standing state for 7 days at room temperature. Thus, a composite material of a unidirectional sheet-like article was obtained.

(Evaluation of Tensile Strength of Composite Material of Unidirectional Sheet-Like Article)

Tensile strength was measured according to JIS A 1191 (specimen shape: type A) using the composite material. The tensile strength was calculated relative to volume fraction of fiber of 100%, using the volume fraction of fiber Vf of the composite material of the unidirectional sheet-like article thus obtained. Meanwhile, the volume fraction of fiber Vf of the composite material of the unidirectional sheet-like article was obtained by the following formula:

Volume fraction of fiber of composite material of unidirectional sheet-like article(Vf)=Theoretical thickness of unidirectional sheet-like article (mm)÷thickness of specimen obtained from composite material of unidirectional sheet-like article(mm)=[Weight per area of unidirectional sheet-like article(g/m$^2$)÷density of carbon fiber bundles(g/m$^3$)]÷thickness of specimen obtained from composite material of unidirectional sheet-like article(mm).

(Production of Woven Fabric)

A plane weave cloth (woven fabric) having a carbon fiber weight per area of 315 g/m$^2$ was woven using the carbon fiber bundles having the sizing agent of the present invention attached thereto, as wefts (five yarns/inch (2.54 cm)) and warps (five yarns/inch (2.54 cm)).

(Evaluation of Resin Impregnating Ability of Woven Fabric and Production of Woven Fabric Composite Material)

The woven fabric was impregnated with a resin by cutting two sets of five specimens in each set, each specimen measuring 300 mm in width and 300 mm in length, and applying a liquid vinyl ester resin VE1 on the five specimens of one set, and an unsaturated polyester resin UP1 on the five specimens of the other set. The volume fraction of fiber (Vf) was about 40%. Here, VE1 and UP1 were respectively as follows:

"VE1": A mixture of NEOPOL 8260 (product name, manufactured by U-Pica Co., Ltd.), PARMECK N (product name, manufactured by NOF Corp.), and a 6 mass % cobalt naphthenate solution at a ratio of NEOPOL 8260/PARMECK N/6 mass % cobalt naphthenate=100/1/0.5 (mass ratio).

"UP1": A mixture of U-PICA 4521PT (product name, manufactured by U-Pica Co., Ltd.) and PARMECK N (product name, manufactured by NOF Corp.) at a ratio of U-PICA 4521PT/PARMECK N=100/1 (mass ratio).

At this time, resin impregnating ability in the process of applying a resin on the woven fabric was evaluated by observing the rate of incorporation of the resin into the woven fabric and foaming (bubbles appear in the surface layer due to replacement of air in the woven fabric with the resin) in the surface layer when the resin liquid was applied on the surface layer of the woven fabric, according to the following criteria: ⊙: foaming occurs to a large extent, and resin intake is very fast, ◯: foaming occurs, and satisfactory resin intake, and x: not very much foaming and mild resin intake.

Five sheets of the woven fabric impregnated with a resin, which were obtained after performing the evaluation of resin impregnating ability, were laminated, and the resin was cured by performing heating under the curing conditions described below. Thus, a composite material of woven fabric having a thickness of about 2 mm was produced.

"Curing conditions for VE1": Heated for 2 hours at 60° C., subsequently for 2 hours at 80° C., and subsequently for 2 hours at 120° C.

"Curing conditions for UP1": Left to stand overnight at room temperature, and then heated for 2 hours at 60° C., subsequently for 2 hours at 80° C., and subsequently for 2 hours at 120° C.

Meanwhile, the volume fraction of fiber Vf of the woven fabric composite material can be calculated by the same technique as in the case of the unidirectional sheet-like article composite material.

(Measurement of Flexural Strength of Woven Fabric Composite Material)

A bending test was carried out for the woven fabric composite material according to ASTM-D-790, which is a general evaluation method for mechanical characteristics of a laminate plate, and thus the flexural strength was determined. Here, the evaluation of the woven fabric laminate plate was carried out by inserting a film between the loading nose and the specimen sample so as to prevent breakage caused by stress concentration.

Example 1

(1. Preparation of Sizing Agent)

A sizing agent was prepared by the phase inversion emulsification technique by the following procedure, using a mixer (manufactured by Tokushu Kika Kogyo Co., Ltd., product name: HIVIS DISPER MIX, homomixer specification: Model 3D-5 type).

For the component (C), a product obtained by drying the component (C) indicated in the column for Example 1 of Table 1 (the details of the various components are indicated in Table 4), which was in the state of an aqueous dispersion, at 120° C. for 2 hours, and thereby removing water by evaporation, was used.

Components, except for the component (D), of the kinds and amounts of incorporation indicated in the column for Example 1 of Table 1 were kneaded and mixed at 120° C. using a planetary mixer and a homomixer. Thereafter, while the mixture was kneaded, the temperature was raised to 90° C., and subsequently, an aqueous solution of the component (D) was added thereto in small amounts. This process led to a slow increase in the viscosity of the content. After the entirety of the aqueous solution of the component (D) was introduced, the mixture was adjusted to 60° C. over 10 minutes while being kneaded. Next, deionized water was added dropwise thereto in small amounts, and after the mixture passed the phase inversion point, the amount of water to be dropped was increased. Finally, an aqueous dispersion of sizing agent at a sizing agent concentration of about 40% by mass was obtained. Meanwhile, in Tables 1 to 3, the composition of a sizing agent is indicated in parts by mass. However, for the components obtained in the form of an aqueous dispersion or an aqueous solution, the composition is indicated in parts by mass excluding water.

(2-1. Production of Sizing-Treated Carbon Fiber)

Carbon fibers having a sizing agent for carbon fiber attached thereto were produced by the following procedure. An immersion tank equipped with an immersion roller inside, was filled with the aqueous dispersion of sizing agent, and carbon fiber bundles (manufactured by Mitsubishi Rayon Co., Ltd., product name: PYROFIL TR50S, number of filaments: 12,000, strand tensile strength: 5,000 MPa, strand tensile modulus: 242 GPa, and fiber density: 1.81 g/cm$^3$) to which a sizing agent was not applied was immersed in the aqueous dispersion. Thereafter, the carbon fiber bundles were dried in hot air, and thus carbon fiber bundles having a sizing agent attached thereto were obtained. Meanwhile, the carbon fiber bundles were taken up by winding on a bobbin. At this time, the processes including from the hot air drying treatment to the take-up by winding on a bobbin were observed, and an evaluation of the sizing treatment process passability was carried out. There was no occurrence of both fuzzing and winding, and the carbon fiber bundles were very stable. Furthermore, the amount of applied sizing agent to carbon fibers, and the cantilever value of the carbon fiber bundles having the sizing agent attached thereto were measured by the methods described above. The results are presented in Table 1. Meanwhile, as described above, the carbon fiber bundles for cantilever value measurement were collected before winding on a bobbin.

Furthermore, in the observation of the surface state of the carbon fibers having the sizing agent for carbon fiber attached thereto, irregular attachment of the sizing agent was not observed. The results are presented in Table 1.

(3-1. Unidirectional Sheet-Like Article)

A unidirectional sheet-like article was obtained by mixing, in one direction, the carbon fiber bundles having the sizing agent attached thereto as obtained in the above section 2-1, at an interval of 2.5 mm and a width of 300 mm using a butt strap and a comb; disposing on both surfaces thereof an interlaced yarn (0.03 g/m) of a glass fiber (tensile modulus: 72.5 GPa) and a low melting point nylon fiber (multifilament, melting point: 125° C.) at an interval of 25 mm on each surface (in a sheet, the weft is disposed alternately on both surfaces at an interval of 12.5 mm); and thermally fusing the sheet-like article at 180° C. by hot pressing. Furthermore, the bending resistance of the unidirectional sheet-like article thus obtained was measured by the method described above. The results are presented in Table 1.

(3-2. Composite Material of Unidirectional Sheet-Like Article and Epoxy Resin)

A room temperature-curable epoxy resin EP1 that will be described below was prepared, and the unidirectional sheet-like article obtained in the above section 3-1 was impregnated therewith. The resultant was cured in a standing state for 7 days at room temperature, and thus a composite material of a unidirectional sheet-like article was obtained. Meanwhile, the room temperature-curable epoxy resin EP1 was a mixture of an epoxy resin (manufactured by Konishi Co., Ltd., product name: E2500S) as a main agent and a curing agent, at a ratio of 100 parts by mass of the main agent and 50 parts by mass of the curing agent.

Furthermore, for the composite material of the unidirectional sheet-like article thus obtained, an evaluation of the tensile strength of the composite material of the unidirectional sheet-like article described above was carried out. The results are presented in Table 1.

(4-1. Production of Woven Fabric)

A plane weave cloth (woven fabric) having a carbon fiber weight per area of 315 g/m$^2$ was woven using the carbon fiber bundles having the sizing agent attached thereto as obtained in the above section 2-1, as wefts (five yarns/inch (2.54 cm)) and warps (five yarns/inch (2.54 cm)).

(4-2. Composite Material of Woven Fabric and Radical Polymerization-Based Resin)

The woven fabric obtained in the above section 4-1 was impregnated with a resin by cutting two sets of five specimens in each set, each specimen measuring 300 mm in width and 300 mm in length, and applying a liquid vinyl ester resin VE1 on the five specimens of one set, and an unsaturated polyester resin UP1 on the five specimens of the other set. The volume fraction of fiber (Vf) was about 40%. Here, VE1 and UP1 were as described above.

At this time, the resin impregnating ability in the process of applying a resin in the woven fabric was evaluated according to the criteria described above, and foaming occurred, while resin intake was satisfactory. The results are presented in Table 1 as "resin impregnating ability".

Five sheets of the woven fabric impregnated with a resin, which were obtained after performing the evaluation of resin impregnating ability, were laminated, and the resin was cured by performing heating under the curing conditions described below. Thus, a composite material of woven fabric having a thickness of about 2 mm was produced.

"Curing conditions for VE1": Heated for 2 hours at 60° C., subsequently for 2 hours at 80° C., and subsequently for 2 hours at 120° C.

"Curing conditions for UP1": Left to stand overnight at room temperature, and then heated for 2 hours at 60° C., subsequently for 2 hours at 80° C., and subsequently for 2 hours at 120° C.

Meanwhile, the volume fraction of fiber Vf of the woven fabric composite material was calculated by the same technique as in the case of the unidirectional sheet-like article composite material.

(4-3. Evaluation of Flexural Strength of Composite Material of Woven Fabric and Radical Polymerization-Based Resin)

An evaluation of flexural strength of the composite material of woven fabric described above was carried out for the composite material between woven fabric and a radical polymerization-based resin obtained in the above section 4-2. The results are presented in Table 1.

Example 2

An aqueous dispersion of sizing agent was prepared by the same method as that used in Example 1, except that the compounds indicated in the column for Example 2 of Table 1 were used as the component (C), and a sizing treatment of carbon fibers was carried out using this aqueous dispersion. Thus, carbon fiber bundles having a sizing agent attached thereto were obtained, and production and evaluation of a sheet-like article and a woven fabric using these carbon fiber bundles were carried out. Meanwhile, for the component (C), products obtained in the state of an aqueous dispersion were dried and used as in the case of Example 1. The results are presented in Table 1.

Examples 3 to 17

In the respective Examples, an aqueous dispersion of a polyurethane resin was directly used as the component (C). That is, an aqueous dispersion of sizing agent was prepared by the same method as that used in Example 1, using the components other than the component (C) in the composition of the sizing agents respectively indicated in the columns for Examples 3 to 17 of Table 1 or Table 2, and then an aqueous dispersion of a polyurethane resin as the component (C) was mixed with this aqueous dispersion of sizing agent that did not contain the component (C). Thus, aqueous dispersion s of sizing agents were obtained. Except for this, a sizing treatment of carbon fibers was carried out in the same manner as in Example 1, and thus carbon fiber bundles having sizing agents attached thereto were obtained. Production and evaluation of sheet-like articles and woven fabrics using these carbon fiber bundles were carried out. The results are presented in Table 1 or Table 2.

Example 18

A sizing treatment of carbon fibers was carried out using the aqueous dispersion of sizing agent obtained in Example 3, and the amount of applied sizing agent was set to 1.6% by mass. Except for this, a carbon fiber bundle applied with the sizing agent was obtained in the same manner as in Example 1, and preparation and evaluation of a sheet-like article and a woven fabric using this were carried out. The results are presented in Table 2.

Example 19

A sizing treatment of carbon fibers was carried out using the aqueous dispersion of sizing agent obtained in Example 3, and the amount of applied sizing agent was set to 0.8% by mass. Except for this, a carbon fiber bundle applied with the sizing agent was obtained in the same manner as in Example 1, and preparation and evaluation of a sheet-like article and a woven fabric using this were carried out. The results are presented in Table 2.

Example 20

The carbon fiber bundle to be sizing treated was produced as described in the following section 2-2, and a sizing treatment of the carbon fiber bundle was carried out using the aqueous dispersion of sizing agent obtained in Example 1. Except for this, a carbon fiber bundle applied with the sizing agent was obtained in the same manner as in Example 1, and the same evaluation as that performed in Example 1 was carried out for the carbon fiber bundle applied with the sizing agent. The results are presented in Table 2.

(2-2. Carbon Fiber Bundle Having No Sizing Agent Attached Thereto)

As a carbon fiber bundle having no sizing agent attached thereto, PYROFIL TRH50 (product name, manufactured by Mitsubishi Rayon Co., Ltd., product name: number of filaments: 18,000, strand strength: 5,600 MPa, strand elastic modulus: 256 GPa, and fiber density: 1.82 g/cm$^3$) was used.

(5-1. Pultrusion Molding Composite Material)

A pultrusion molding composite material was obtained by performing pultrusion molding by a molding process such as described in FIG. 1, using 34 carbon fiber bundles (number of introduced bundles: 34) that were obtained by attaching the above-described sizing agent to the carbon fiber bundle having no sizing agent attached thereto of the above section 2-2. The carbon fiber bundles F having the sizing agent attached thereto were respectively wound from a creel 1, and were arranged in a sheet form through a guide roller 2. Thereafter, the carbon fiber bundles F having the sizing agent attached thereto were immersed in a thermosetting resin EP2 that will be described below in a resin bath 3, the same resin was attached to the carbon fiber bundles, and then the carbon fiber bundles were scrubbed by a guide bar 4. Thus, the carbon fiber bundles F having the sizing agent attached thereto were impregnated with the same resin, and at the same time, excess resin was removed to a certain extent. Furthermore, one carbon fiber bundle F having a sizing agent attached thereto was passed through each hole 5a of a perforated guide 5 in which a large number of through-holes 5a were formed on a plate, and thereby excess resin was squeezed to a certain extent. Then, the carbon fiber bundles were introduced into a mold for pultrusion 6 having a pultrusion channel 6a that forms a circular cross-section having a diameter of 6 mm, and excess resin was finally removed. The mold temperature of the mold for pultrusion 6 was 200° C., and the rate of molding was 0.25 m/minute.

Here, the thermosetting resin EP2 used in pultrusion molding was as follows.

"EP2": A mixture obtained by mixing a main agent (manufactured by Nagase ChemteX Corp., product name: XNR6830), a curing agent (manufactured by Nagase ChemteX Corp., product name: XNH6830(M)), and an internal mold releasing agent (manufactured by Axel Plastics Research Laboratories, Inc., product name: MoldWiz INT-1846N2) at a mass ratio of main agent/curing agent/internal mold releasing agent=100/100/0.75.

(5-2. Evaluation of Tensile Strength of Pulturded Composite Material)

The tensile strength of the pultrusion molded product obtained in the above section 5-1 was measured according to the "Tensile test method using expanded material for fixation" of Japan Society of Civil Engineers. The tensile strength was calculated relative to the volume fraction of fiber of 100%, using the volume fraction of fiber Vf of the pultrusion molded product thus obtained. The results are presented in Table 2. Meanwhile, the volume fraction of fiber (%) of the pultrusion molded product was obtained using the following formula:

Fiber volume percentage convent Vf of pultrusion molded product=(Fiber bundle weight per area× number of introduced bundles÷fiber density)÷ [(outer diameter of pultrusion molded product÷2)$^2$×3.1416]×100

Meanwhile, the outer diameter of the pultrusion molded product was determined by measuring the outer diameter in a direction perpendicular to the longitudinal direction of the pultrusion molded product at 6 sites using a micrometer, and the average value was used. Furthermore, for the fiber bundle weight per area in the above formula was obtained by performing measurement of 12 fiber bundles among the 34 carbon fiber bundles introduced, and the average value was used. The fiber density was the fiber density of PYROFIL TRH50.

Example 21

The carbon fiber bundle to be sizing treated was produced as described in the above section 2-2, and a sizing treatment of the carbon fiber bundle was carried out using the aqueous dispersion of sizing agent obtained in Example 2. Except for this, a carbon fiber bundle applied with the sizing agent was obtained in the same manner as in Example 1, and the same evaluation as that performed in Example 1 was carried out for the carbon fiber bundle applied with the sizing agent. Furthermore, production and evaluation of a pultrusion molding composite material were carried out in the same manner as in Example 20, using the carbon fiber bundle applied with the sizing agent thus obtained. The results are presented in Table 2.

Example 22

The carbon fiber bundle to be sizing treated was produced as described in the above section 2-2, and a sizing treatment of the carbon fiber bundle was carried out using the aqueous dispersion of sizing agent obtained in Example 3. Except for this, a carbon fiber bundle applied with the sizing agent was obtained in the same manner as in Example 1, and the same evaluation as that performed in Example 1 was carried out for the carbon fiber bundle applied with the sizing agent. Furthermore, production and evaluation of a pultrusion molding composite material were carried out in the same manner as in Example 20, using the carbon fiber bundle applied with the sizing agent thus obtained. The results are presented in Table 2.

Example 23

The carbon fiber bundle to be sizing treated was produced as described in the above section 2-2, and a sizing treatment of the carbon fiber bundle was carried out using the aqueous dispersion of sizing agent obtained in Example 12. Except for this, a carbon fiber bundle applied with the sizing agent was obtained in the same manner as in Example 1, and the same evaluation as that performed in Example 1 was carried out for the carbon fiber bundle applied with the sizing agent. Furthermore, production and evaluation of a pultrusion molding composite material were carried out in the same manner as in Example 20, using the carbon fiber bundle applied with the sizing agent thus obtained. The results are presented in Table 2.

Example 24

The carbon fiber bundle to be sizing treated was produced as described in the above section 2-2, and a sizing treatment of the carbon fiber bundle was carried out using the aqueous dispersion of sizing agent obtained in Example 13. Except for this, a carbon fiber bundle applied with the sizing agent was obtained in the same manner as in Example 1, and the same evaluation as that performed in Example 1 was carried out for the carbon fiber bundle applied with the sizing agent. Furthermore, production and evaluation of a pultrusion molding composite material were carried out in the same manner as in Example 20, using the carbon fiber bundle applied with the sizing agent thus obtained. The results are presented in Table 2.

Comparative Examples 1 to 10

In the respective Examples, the composition indicated in each of the columns for Comparative Examples 1 to 10 of Table 3 was used as the composition for the sizing agent, and an aqueous dispersion of a polyurethane resin was directly used as the component (C). That is, an aqueous dispersion of sizing agent was prepared by the same method as that used in Example 1, using the components other than the component (C) in the composition of the sizing agents respectively indicated in the columns for Comparative Examples 1 to 10 of Table 3, and then an aqueous dispersion of a polyurethane resin as the component (C) was mixed with this aqueous dispersion of sizing agent that did not contain the component (C). Thus, aqueous dispersion s of sizing agents were obtained. Except for this, a sizing treatment of carbon fibers was carried out in the same manner as in Example 1, and thus carbon fiber bundles having sizing agents attached thereto were obtained. Production and evaluation of sheet-like articles and woven fabrics using these carbon fiber bundles were carried out. The results are presented in the columns for Comparative Examples 1 to 10 of Table 3.

Comparative Example 11

The carbon fiber bundle to be sizing treated was produced as described in the above section 2-2, and a sizing treatment of the carbon fiber bundle was carried out using the aqueous dispersion of sizing agent obtained in Comparative Example 9. Except for this, a carbon fiber bundle applied with the sizing agent was obtained in the same manner as in Example 1, and the same evaluation as that performed in Example 1 was carried out for the carbon fiber bundle applied with the sizing agent. Furthermore, production and evaluation of a pultrusion molding composite material were carried out in the same manner as in Example 20, using the carbon fiber bundle applied with the sizing agent thus obtained. The results are presented in Table 3.

The components indicated in Tables 1 to 3 are respectively described in detail in Table 4. For the tensile elongation and glass transition temperature (Tg) of a cured product of a urethane acrylate oligomer, the particle size of a polyurethane emulsion, the tensile strength of a dried coating film, the tensile elongation of a dried coating film, and the glass transition temperature, the catalogue values were employed.

More specifically, A1 to A2 and E1 to E3 in Table 3 were synthesized products respectively obtained by the following procedure.

Component (A), Single Terminal Acrylic Acid-Modified Diglycidyl Ether Bisphenol A Here, in regard to A1 and A2, the half ester component effective as the component (A) was ½, and the other ½ included unreacted reactants and diester products. The amount of incorporation of A1 to A2 indicated in Tables 1 to 3 indicate the total amount of the half ester component, unreacted reactants, and diester products. Therefore, the amount of active ingredient as the half ester was 1.2 of the amount of incorporation of Tables 1 to 3. That is, when the content of the component (A) in the sizing agent was calculated, a value equivalent to a half the amounts of incorporation of A1 and A2 indicated in the tables is used. However, the total amount of the sizing components includes not only the amount of incorporation of the half ester component, but also the amounts of incorporation of the unreacted reactants and the diester products. That is, in order to calculate the total amount of the sizing component, the values of the amounts of incorporation of A1 and A2 indicated in the tables are used.

A1: A mixture obtained by adding 86 parts by mass of acrylic acid, 1 part by mass of hydroquinone, and 1 part by mass of lithium chloride to 378 parts by mass of bisphenol A type epoxy resin (manufactured by Japan Epoxy Resin Co., Ltd., product name: JER828), and allowing the mixture to react by heating to 100° C., the mixture being at a mixing mass ratio of JER828/JER828 single terminal acryl-modified epoxy resin (half ester)/JER828 two terminal acrylic modified epoxy resin (diester) of 1/2/1.

A2: A mixture obtained by adding 86 parts by mass of acrylic acid, 1 part by mass of hydroquinone, and 1 part by mass of lithium chloride to 1000 parts by mass of a bisphenol A type epoxy resin (manufactured by Japan Epoxy Resin Co., Ltd., product name: JER834), and allowing the mixture to react by heating to 100° C., the mixture being at a mixing mass ratio of JER834/JER834 single terminal acryl-modified epoxy resin (half ester)/JER834 two terminal acrylic modified epoxy resin (diester) of 1/2/1.

Component (E), Method for Producing Polyester

E1: E1 was obtained by allowing 800 parts by mass of a PO adduct of bisphenol A (manufactured by Sanyo Chemical Industries, Ltd., product name: NEWPOL BP-3P), in which 3 molar parts of PO (propylene oxide) were added to 1 molar part of bisphenol A, 278 parts by mass of fumaric acid (alcohol/acid=1/1.2 as a molar ratio), and 1 part by mass of tetraisopropoxy titanate, to react for 10 hours in a glass reactor, while distilling off water at a pressure reduced to −0.1 MPa (gauge pressure) at 180° C. under a nitrogen stream.

E2: 400 parts by mass of a PO adduct of bisphenol A (manufactured by Sanyo Chemical Industries, Ltd., product name: NEWPOL BP-3P), in which 3 molar parts of PO (propylene oxide) were added to 1 molar part of bisphenol A, 139 parts by mass of fumaric acid (alcohol/acid=1/1.2 as a molar ratio), and 1 part by mass of tetraisopropoxy titanate, were allowed to react for 10 hours in a glass reactor, while water was distilled off at 180° C. under a nitrogen stream. Furthermore, 668 parts by mass of an EO adduct of bisphenol A (manufactured by Sanyo Chemical Industries, Ltd., product name: NEWPOL BPE-100), in which 10 molar parts of EO (ethylene oxide) were added to 1 molar part of bisphenol A, was added to the reaction product, and E2 was obtained by allowing the mixture to react for 10 hours while distilling off water at a pressure reduced to −0.1 MPa (gauge pressure) at 180° C.

E3: 800 parts by mass of a PO adduct of bisphenol A (manufactured by Sanyo Chemical Industries, Ltd., product name: NEWPOL BP-3P), in which 3 molar parts of PO (propylene oxide) were added to 1 molar part of bisphenol A, 232 parts by mass of fumaric acid (alcohol/acid=1/1 as a molar ratio), and 1 part by mass of tetraisopropoxy titanate, were allowed to react for 10 hours in a glass reactor, while water was distilled off at 180° C. under a nitrogen stream. Furthermore, 668 parts by mass of an EO adduct of bisphenol A (manufactured by Sanyo Chemical Industries, Ltd., product name: NEWPOL BPE-100), in which 10 molar parts of EO (ethylene oxide) were added to 1 molar part of bisphenol A, was added to the reaction product, and E2 was obtained by allowing the mixture to react for 10 hours while distilling off water at a pressure reduced to −0.1 MPa (gauge pressure) at 180° C.

As can be seen from the above results, the carbon fiber bundles in the case of applying the sizing agents of Examples 1 to 24 did not exhibit any fuzzing or winding on the roll during the processes including from the hot air drying treatment after a sizing treatment to the take-up by winding on a bobbin, and the process passability was very stable. Furthermore, the molded products (unidirectional carbon fiber sheet-like article composite materials, woven fabric composite materials, and pultrusion molding composite materials) produced using these carbon fiber bundles all had satisfactory properties.

TABLE 1

| | | | Example 1 | Example 2 | Example 3 | Example 4 | Example 5 | Example 6 | Example 7 |
|---|---|---|---|---|---|---|---|---|---|
| Composition | Component (A) | A1 | | | | | | | |
| | | A2 | 16 | 16 | 17 | 17 | 17 | 17 | 15 |
| | Component (B) | CN981 | 12 | 12 | 13 | 13 | 13 | 13 | 15 |
| | | CN9788 | | | | | | | |
| | Component (C) | U-COAT UWS-145 | 35 | | 35 | | | | 35 |
| | | PERMALIN U 368 | | 35 | | | | | |
| | | SUPERFLEX 150HS | | | | 35 | | | |
| | | SUPERFLEX 470 | | | | | 35 | | |
| | | KP-2820 | | | | | | 35 | |
| | Component (D) | NEWCOL 723 | 14 | 14 | 13 | 13 | 13 | 13 | 13 |
| | Component (D-1) | NEWCOL 723-SF | | | | | | | |
| | Component (D-2) | FINESURF FON180E06 (ISEO) | 2 | 2 | 2 | 2 | 2 | 2 | 2 |

TABLE 1-continued

|  |  |  |  |  |  |  |  |  |  |  |
|---|---|---|---|---|---|---|---|---|---|---|
| Component (E) | E1 |  | 10 | 10 | 10 | 10 | 10 | 10 | 10 |
|  | E2 |  | 11 | 11 | 10 | 10 | 10 | 10 | 10 |
|  | E3 |  |  |  |  |  |  |  |  |
| Other components | CN-963 |  |  |  |  |  |  |  |  |
|  | SUPERFLEX 150 |  |  |  |  |  |  |  |  |
|  | SUPERFLEX E-4000 |  |  |  |  |  |  |  |  |
|  | HYDRAN HW-350 |  |  |  |  |  |  |  |  |
|  | JER834 |  |  |  |  |  |  |  |  |
| Method for adding component (C) |  |  | Single-agent emulsification | Single-agent emulsification | Mixing of dispersion liquids | Mixing of dispersion liquids | Mixing of dispersion liquids | Mixing of dispersion liquids | Mixing of dispersion liquids |
| Average particle size of prepared sizing agent |  | (μm) | 0.12 | 0.13 | 0.11 | 0.11 | 0.12 | 0.13 | 0.11 |
| Sizing-treated carbon fiber bundle |  |  | TR50S | TR50S | TR50S | TR50S | TR50S | TR50S | TR50S |
| Sizing treatment process passability |  |  | ○ | ○ | ○ | ○ | ○ | ○ | ○ |
| Presence or absence of irregular attachment of sizing agent |  |  | ○ | ○ | ○ | ○ | ○ | ○ | ○ |
| Amount of applied sizing agent |  | (mass %) | 1.21 | 1.20 | 1.21 | 1.19 | 1.20 | 1.21 | 1.19 |
| Cantilever value of carbon fiber |  | (mm) | 320 | 326 | 321 | 383 | 412 | 298 | 316 |
| Bending resistance of unidirectional sheet-like article |  | (mm) | 219 | 230 | 221 | 248 | 238 | 208 | 228 |
| Unidirectional sheet-like article composite material | (resin, EP1) | Tensile strength (calculated relative to Vf100%) (MPa) | 4,250 | 4,370 | 4,240 | 4,480 | 4,460 | 4,100 | 4,300 |
|  |  | Volume fraction of fiber Vf (%) | 34 | 35 | 34 | 35 | 35 | 34 | 36 |
| Woven fabric composite material | (resin, VE1) | Resin impregnating ability | ○ | ◎ | ◎ | ○ | ○ | ◎ | ◎ |
|  |  | flexural strength (MPa) | 880 | 880 | 880 | 830 | 850 | 880 | 860 |
|  |  | Volume fraction of fiber Vf (%) | 40 | 39 | 40 | 40 | 39 | 40 | 40 |
| Woven fabric composite material | (resin, UP1) | Resin impregnating ability | ○ | ◎ | ◎ | ○ | ○ | ◎ | ◎ |
|  |  | flexural strength (MPa) | 740 | 720 | 730 | 680 | 670 | 730 | 700 |
|  |  | Volume fraction of fiber Vf (%) | 39 | 39 | 38 | 39 | 40 | 40 | 40 |
| Pultrusion molding composite material | (resin, EP2) | Tensile strength (MPa) | — | — | — | — | — | — | — |
|  |  | Volume fraction of fiber Vf (%) | — | — | — | — | — | — | — |

|  |  |  |  | Example 8 | Example 9 | Example 10 | Example 11 | Example 12 |
|---|---|---|---|---|---|---|---|---|
| Composition | Component (A) | A1 |  |  |  | 17 |  |  |
|  |  | A2 |  | 36 | 22 |  | 17 | 14 |
|  | Component (B) | CN981 |  | 6 | 20 | 13 |  | 14 |
|  |  | CN9788 |  |  |  |  | 13 |  |
|  | Component (C) | U-COAT UWS-145 |  | 35 | 35 | 35 | 35 | 45 |
|  |  | PERMALIN U 368 |  |  |  |  |  |  |
|  |  | SUPERFLEX 150HS |  |  |  |  |  |  |
|  |  | SUPERFLEX 470 |  |  |  |  |  |  |
|  |  | KP-2820 |  |  |  |  |  |  |
|  | Component (D) | NEWCOL 723 |  | 13 | 13 | 13 | 13 | 11 |
|  | Component (D-1) | NEWCOL 723-SF |  |  |  |  |  |  |
|  | Component (D-2) | FINESURF FON180E06 (ISEO) |  | 2 | 2 | 2 | 2 | 2 |
|  | Component (E) | E1 |  | 4 | 4 | 10 | 10 | 7 |
|  |  | E2 |  | 4 | 4 | 10 | 10 | 7 |
|  |  | E3 |  |  |  |  |  |  |
|  | Other components | CN-963 |  |  |  |  |  |  |
|  |  | SUPERFLEX 150 |  |  |  |  |  |  |
|  |  | SUPERFLEX E-4000 |  |  |  |  |  |  |
|  |  | HYDRAN HW-350 |  |  |  |  |  |  |
|  |  | JER834 |  |  |  |  |  |  |

TABLE 1-continued

|  |  |  | Mixing of dispersion liquids | Mixing of dispersion liquids | Mixing of dispersion liquids | Mixing of dispersion liquids | Mixing of dispersion liquids |
|---|---|---|---|---|---|---|---|
| Method for adding component (C) |  |  | Mixing of dispersion liquids | Mixing of dispersion liquids | Mixing of dispersion liquids | Mixing of dispersion liquids | Mixing of dispersion liquids |
| Average particle size of prepared sizing agent |  | (μm) | 0.11 | 0.11 | 0.11 | 0.11 | 0.10 |
| Sizing-treated carbon fiber bundle |  |  | TR50S | TR50S | TR50S | TR50S | TR50S |
| Sizing treatment process passability |  |  | ○ | ○ | ○ | ○ | ○ |
| Presence or absence of irregular attachment of sizing agent |  |  | ○ | ○ | ○ | ○ | ○ |
| Amount of applied sizing agent |  | (mass %) | 1.20 | 1.20 | 1.20 | 1.21 | 1.21 |
| Cantilever value of carbon fiber |  | (mm) | 312 | 283 | 297 | 330 | 342 |
| Bending resistance of unidirectional sheet-like article |  | (mm) | 212 | 203 | 204 | 216 | 225 |
| Unidirectional sheet-like article composite material | (resin, EP1) | Tensile strength (calculated relative to Vf100%) (MPa) | 4,230 | 4,160 | 4,210 | 4,440 | 4,470 |
|  |  | Volume fraction of fiber Vf (%) | 36 | 34 | 34 | 34 | 35 |
| Woven fabric composite material | (resin, VE1) | Resin impregnating ability | ◎ | ◎ | ◎ | ○ | ○ |
|  |  | flexural strength (MPa) | 820 | 840 | 880 | 890 | 820 |
|  |  | Volume fraction of fiber Vf (%) | 40 | 39 | 38 | 39 | 39 |
| Woven fabric composite material | (resin, UP1) | Resin impregnating ability | ◎ | ◎ | ◎ | ○ | ○ |
|  |  | flexural strength (MPa) | 680 | 700 | 720 | 750 | 680 |
|  |  | Volume fraction of fiber Vf (%) | 40 | 39 | 39 | 40 | 38 |
| Pultrusion molding composite material | (resin, EP2) | Tensile strength (MPa) | — | — | — | — | — |
|  |  | Volume fraction of fiber Vf (%) | — | — | — | — | — |

TABLE 2

|  |  |  | Example 13 | Example 14 | Example 15 | Example 16 | Example 17 | Example 18 | Example 19 |
|---|---|---|---|---|---|---|---|---|---|
| Composition | Component (A) | A1 |  |  |  |  |  | The same as Example 3 | The same as Example 3 |
|  |  | A2 | 20 | 25 | 17 | 17 | 17 |  |  |
|  | Component (B) | CN981 | 15 | 18 | 13 | 13 | 13 |  |  |
|  |  | CN9788 |  |  |  |  |  |  |  |
|  | Component (C) | U-COAT UWS-145 | 25 | 5 | 35 | 35 | 20 |  |  |
|  |  | PERMALIN UA-368 |  |  |  |  |  |  |  |
|  |  | SUPERFLEX 150HS |  |  |  |  |  |  |  |
|  |  | SUPERFLEX 470 |  |  |  |  |  |  |  |
|  |  | KP-2820 |  |  |  |  |  |  |  |
|  | Component (D) | NEWCOL 723 | 15 | 19 |  | 13 | 13 |  |  |
|  | Component (D-1) | NEWCOL 723-SF |  |  | 13 |  |  |  |  |
|  | Component (D-2) | FINESURF FON180E06 (ISEO) | 3 | 3 | 2 | 2 | 2 |  |  |
|  | Component (E) | E1 | 11 | 15 | 10 | 10 | 17.5 |  |  |
|  |  | E2 | 11 | 15 | 10 | 10 | 17.5 |  |  |
|  |  | E3 |  |  |  |  | 10 |  |  |
|  | Other components | CN-963 |  |  |  |  |  |  |  |
|  |  | SUPERFLEX 150 |  |  |  |  |  |  |  |
|  |  | SUPERFLEX E-4000 |  |  |  |  |  |  |  |
|  |  | HYDRAN HW-350 |  |  |  |  |  |  |  |
|  |  | JER834 |  |  |  |  |  |  |  |
| Method for adding component (C) |  |  | Mixing of dispersion liquids | Mixing of dispersion liquids | Mixing of dispersion liquids | Mixing of dispersion liquids | Mixing of dispersion liquids |  |  |
| Average particle size of prepared sizing agent |  | (μm) | 0.11 | 0.11 | 0.11 | 0.11 | 0.11 |  |  |

TABLE 2-continued

| | | | | | | | | | | |
|---|---|---|---|---|---|---|---|---|---|---|
| Sizing-treated carbon fiber bundle | | | | TR50S | TR50S | TR50S | TR50S | TR50S | TR50S | TR50S |
| Sizing treatment process passability | | | | ○ | ○ | ○ | ○ | ○ | ○ | ○ |
| Presence or absence of irregular attachment of sizing agent | | | | ○ | ○ | ○ | ○ | ○ | ○ | ○ |
| Amount of applied sizing agent | | | (mass %) | 1.19 | 1.20 | 1.19 | 1.21 | 1.21 | 1.60 | 0.80 |
| Cantilever value of carbon fiber | | | (mm) | 303 | 276 | 328 | 323 | 273 | 348 | 276 |
| Bending resistance of unidirectional sheet-like article | | | (mm) | 210 | 204 | 218 | 219 | 218 | 242 | 188 |
| Unidirectional sheet-ice article composite material | (resin; EP1) | Tensile strength (calculated relative to Vf100%) | (MPa) | 4,310 | 4,020 | 4,410 | 4,430 | 4,020 | 4,280 | 4,010 |
| | | Volume fraction of fiber Vf | (%) | 35 | 35 | 34 | 34 | 34 | 35 | 34 |
| Woven fabric composite material | (resin; VE1) | Resin impregnating ability | | ◎ | ◎ | ◎ | ◎ | ◎ | ○ | ◎ |
| | | flexural strength | (MPa) | 900 | 920 | 920 | 890 | 850 | 800 | 910 |
| | | Volume fraction of fiber Vf | (%) | 40 | 39 | 38 | 40 | 39 | 39 | 37 |
| Woven fabric composite material | (resin; UP1) | Resin impregnating ability | | ◎ | ◎ | ◎ | ◎ | ◎ | ○ | ◎ |
| | | flexural strength | (MPa) | 760 | 780 | 760 | 740 | 700 | 690 | 770 |
| | | Volume fraction of fiber Vf | (%) | 40 | 39 | 38 | 38 | 39 | 38 | 40 |
| Pultrusion molding composite material | (resin; EP2) | Tensile strength | (MPa) | — | — | — | — | — | — | — |
| | | Volume fraction of fiber Vf | (%) | — | — | — | — | — | — | — |

| | | | | | Example 20 | Example 21 | Example 22 | Example 23 | Example 24 |
|---|---|---|---|---|---|---|---|---|---|
| Composition | Component (A) | A1 | | | The same as Example 1 | The same as Example 2 | The same as Example 3 | The same as Example 12 | The same as Example 13 |
| | | A2 | | | | | | | |
| | Component (B) | CN981 | | | | | | | |
| | | CN9788 | | | | | | | |
| | Component (C) | U-COAT UWS-145 | | | | | | | |
| | | PERMALIN UA-368 | | | | | | | |
| | | SUPERFLEX 150HS | | | | | | | |
| | | SUPERFLEX 470 | | | | | | | |
| | | KP-2820 | | | | | | | |
| | Component (D) | NEWCOL 723 | | | | | | | |
| | Component (D-1) | NEWCOL 723-SF | | | | | | | |
| | Component (D-2) | FINESURF FON180E06 (ISEO) | | | | | | | |
| | Component (E) | E1 | | | | | | | |
| | | E2 | | | | | | | |
| | | E3 | | | | | | | |
| | Other components | CN-963 | | | | | | | |
| | | SUPERFLEX 150 | | | | | | | |
| | | SUPERFLEX E-4000 | | | | | | | |
| | | HYDRAN HW-350 | | | | | | | |
| | | JER834 | | | | | | | |
| Method for adding component (C) | | | | | | | | | |
| Average particle size of prepared sizing agent | | | (μm) | | | | | | |
| Sizing-treated carbon fiber bundle | | | | | TRH50 | TRH50 | TRH50 | TRH50 | TRH50 |
| Sizing treatment process passability | | | | | ○ | ○ | ○ | ○ | ○ |
| Presence or absence of irregular attachment of sizing agent | | | | | ○ | ○ | ○ | ○ | ○ |
| Amount of applied sizing agent | | | (mass %) | | 1.20 | 1.20 | 1.21 | 1.20 | 1.20 |
| Cantilever value of carbon fiber | | | (mm) | | 372 | 382 | 373 | 384 | 335 |
| Bending resistance of unidirectional sheet-like article | | | (mm) | | — | — | — | — | — |
| Unidirectional sheet-ice article composite | (resin; EP1) | Tensile strength (calculated relative to | (MPa) | | — | — | — | — | — |

TABLE 2-continued

| | | | | | | | | |
|---|---|---|---|---|---|---|---|---|
| material | | | Vf100%) | | | | | |
| | | | Volume fraction of fiber Vf | (%) | — | — | — | — | — |
| Woven fabric composite material | (resin; VE1) | Resin impregnating ability | | — | — | — | — | — |
| | | flexural strength | (MPa) | — | — | — | — | — |
| | | Volume fraction of fiber Vf | (%) | — | — | — | — | — |
| Woven fabric composite material | (resin; UP1) | Resin impregnating ability | | — | — | — | — | — |
| | | flexural strength | (MPa) | — | — | — | — | — |
| | | Volume fraction of fiber Vf | (%) | — | — | — | — | — |
| Pultrusion molding composite material | (resin; EP2) | Tensile strength | (MPa) | 5,402 | 5,577 | 5,394 | 5,407 | 5,231 |
| | | Volume fraction of fiber Vf | (%) | 67 | 67 | 68 | 67 | 68 |

TABLE 3

| | | | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|
| Composition | Component (A) | A1 | | | | | | | | |
| | | A2 | | 12 | 43 | 12 | 17 | 17 | 17 | 17 |
| | Component (B) | CN981 | | 18 | | 10 | | 13 | 13 | 13 |
| | | CN9788 | | | | | | | | |
| | Component (C) | U-COAT UWS-145 | | 35 | 20 | 35 | 35 | | | |
| | | PERMALIN UA-368 | | | | | | | | |
| | | SUPERFLEX 150HS | | | | | | | | |
| | | SUPERFLEX 470 | | | | | | | | |
| | | KP-2820 | | | | | | | | |
| | Component (D) | NEWCOL 723 | | 13 | 13 | 13 | 13 | 13 | 13 | 13 |
| | Component (D-1) | NEWCOL 723-SF | | | | | | | | |
| | Component (D-2) | FINESURF FON180E06 (ISEO) | | 2 | 2 | 2 | 2 | 2 | 2 | 2 |
| | Component (E) | E1 | | 10 | 11 | 14 | 10 | 10 | 10 | 10 |
| | | E2 | | 10 | 11 | 14 | 10 | 10 | 10 | 10 |
| | | E3 | | | | | | | | |
| | Other components | CN-963 | | | | | 13 | | | |
| | | SUPERFLEX 150 | | | | | | 35 | | |
| | | SUPERFLEX E-4000 | | | | | | | 35 | |
| | | HYDRAN HW-350 | | | | | | | | 35 |
| | | JER834 | | | | | | | | |
| Method for adding component (C) | | | | Mixing of dispersion liquids | Mixing of dispersion liquids | Mixing of dispersion liquids | Mixing of dispersion liquids | Mixing of dispersion liquids | Mixing of dispersion liquids | Mixing of dispersion liquids |
| Average particle size of prepared sizing agent | | | (μm) | 0.11 | 0.11 | 0.11 | 0.11 | 0.11 | 0.12 | 0.12 |
| Sizing-treated carbon fiber bundle | | | | TR50S | TR50S | TR50S | TR50S | TR50S | TR50S | TR50S |
| Sizing treatment process passability | | | | ◯ | ◯ | ◯ | ◯ | X | X | X |
| Presence or absence of irregular attachment of sizing agent | | | | ◯ | ◯ | ◯ | ◯ | X | X | X |
| Amount of applied sizing agent | | | (mass %) | 1.20 | 1.20 | 1.20 | 1.21 | 1.21 | 1.20 | 1.20 |
| Cantilever value of carbon fiber | | | (mm) | 311 | 320 | 289 | 323 | 292 | 308 | 296 |
| Bending resistance of unidirectional sheet-like article | | | (mm) | 214 | 216 | 199 | 218 | 178 | 268 | 175 |
| Unidirectional sheet-like article composite material | (resin; EP1) | Tensile strength (calculated relative to Vf100%) | (MPa) | 4,180 | 4,170 | 4,030 | 3,980 | 3,620 | 3,450 | 3,550 |

TABLE 3-continued

| | | | | | | | | |
|---|---|---|---|---|---|---|---|---|
| Woven fabric composite material | (resin; VE1) | Volume fraction of fiber Vf | (%) | 36 | 36 | 35 | 35 | 36 | 34 | 35 |
| | | Resin impregnating ability | | ○ | ◎ | ◎ | ◎ | ○ | X | ○ |
| | | flexural strength | (MPa) | 610 | 710 | 620 | 700 | 820 | 720 | 780 |
| Woven fabric composite material | (resin; UP1) | Volume fraction of fiber Vf | (%) | 39 | 39 | 40 | 39 | 39 | 41 | 40 |
| | | Resin impregnating ability | | ○ | ◎ | ○ | ◎ | ○ | X | ○ |
| | | flexural strength | (MPa) | 480 | 610 | 490 | 580 | 660 | 600 | 580 |
| Pultrusion molding composite material | (resin; EP2) | Volume faction of fiber Vf | (%) | 40 | 40 | 40 | 41 | 40 | 41 | 40 |
| | | Tensile strength | (MPa) | — | — | — | — | — | — | — |
| | | Volume fraction of fiber Vf | (%) | — | — | — | — | — | — | — |

| | | | | Comparative Example 8 | Comparative Example 9 | Comparative Example 10 | Comparative Example 11 |
|---|---|---|---|---|---|---|---|
| Composition | Component (A) | A1 | | | | | The same as Comparative Example 9 |
| | | A2 | | 16 | 28 | | |
| | Component (B) | CN981 | | 12 | 20 | 14 | |
| | | CN9788 | | | | | |
| | Component (C) | U-COAT UWS-145 | | 55 | | 35 | |
| | | PERMALIN UA-368 | | | | | |
| | | SUPERFLEX 150HS | | | | | |
| | | SUPERFLEX 470 | | | | | |
| | | KP-2820 | | | | | |
| | Component (D) | NEWCOL 723 | | 8 | 15 | 9.5 | |
| | Component (D-1) | NEWCOL 723-SF | | | | | |
| | Component (D-2) | FINESURF FON180E06 (ISEO) | | 1 | 2 | 1.5 | |
| | Component (E) | E1 | | 4 | 17 | 11 | |
| | | E2 | | 4 | 18 | 12 | |
| | | E3 | | | | | |
| | Other components | CN-963 | | | | | |
| | | SUPERFLEX 150 | | | | | |
| | | SUPERFLEX E-4000 | | | | | |
| | | HYDRAN HW-350 | | | | | |
| | | JER834 | | | | 17 | |
| Method for adding component (C) | | | | Mixing of dispersion liquids | Mixing of dispersion liquids | Mixing of dispersion liquids | |
| Average particle size of prepared sizing agent | | | (μm) | 0.10 | 0.11 | 0.11 | |
| Sizing-treated carbon fiber bundle | | | | TR50S | TR50S | TR50S | TRH50 |
| Sizing treatment process passability | | | | X | ○ | ○ | ○ |
| Presence or absence of irregular attachment of sizing agent | | | | ○ | ○ | ○ | ○ |
| Amount of applied sizing agent | | | (mass %) | 1.19 | 1.20 | 1.20 | 1.20 |
| Cantilever value of carbon fiber | | | (mm) | 363 | 178 | 322 | 186 |
| Bending resistance of unidirectional sheet-like article | | | (mm) | 280 | 161 | 221 | — |
| Unidirectional sheet-like article composite material | (resin; EP1) | Tensile strength (calculated relative to Vf100%) | (MPa) | 3,860 | 3,620 | 3,910 | — |
| | | Volume fraction of fiber Vf | (%) | 35 | 34 | 35 | — |
| Woven fabric composite material | (resin; VE1) | Resin impregnating ability | | X | ◎ | ○ | — |
| | | flexural strength | (MPa) | 740 | 860 | 580 | — |

TABLE 3-continued

| | | | | | | | | |
|---|---|---|---|---|---|---|---|---|
| | | | Volume fraction of fiber Vf | (%) | 40 | 39 | 41 | — |
| | Woven fabric composite material | (resin; UP1) | Resin impregnating ability | | X | ◉ | ○ | — |
| | | | flexural strength | (MPa) | 600 | 710 | 360 | — |
| | | | Volume faction of fiber Vf | (%) | 40 | 41 | 39 | — |
| | Pultrusion molding composite material | (resin; EP2) | Tensile strength | (MPa) | — | — | — | 3,415 |
| | | | Volume fraction of fiber Vf | (%) | — | — | — | 68 |

TABLE 4

| | Title (product name) | Name of substance | Manufacturer |
|---|---|---|---|
| Component (A) | A1 (No product name) | Single-terminal acrylic acid-modified bisphenol A type epoxy resin (JER828 base) | Mitsubishi Rayon Co., Ltd. |
| | A2 (No product name) | Single-terminal acrylic acid-modified bisphenol A type epoxy resin (JER834 base) | Mitsubishi Rayon Co., Ltd. |
| Component (B) | CN-981 | Aliphatic type polyester/polyether type bifunctional urethane acrylate Viscosity; 6,190 mP · s/60° C., Tensile elongation of cured product; 81%, Glass transition temperature of cured product; 22° C. (Both being catalogue values) | Sartomer USA, LLC |
| | CN-9788 | Aliphatic type polyester type bifunctional urethane acrylate Viscosity; 60,000 mP · s/60° C., Tensile elongation of cured product; 52%, Glass transition temperature of cured product; 30° C. (Both being catalogue values) | Saromer USA, LLC |
| Component (C) | U-COAT UWS-145 | Aqueous dispersion of polyurethane Particle size; 0.02 μm, Glass transition point of dried coating film; −20° C. Tensile strength of dried coating film; 21 Mpa, Tensile elongation of dried coating film; 400% (Both being catalogue values) | Sanyo Chemical Industries, Ltd. |
| | PERMALIN UA-368 | Aqueous dispersion of polyurethane Particle size; 0.30 μm, Glass transition point of dried coating film; −20° C. Tensile strength of dried coating film; 32 Mpa, Tensile elongation of dried coating film; 630% (Both being catalogue values) | Sanyo Chemical Industries, Ltd. |
| | SUPERFLEX 470 | Aqueous dispersion of polyurethane Particle size; 0.05 μm, Glass transition point of dried coating film; −31° C. Tensile strength of dried coating film; 40 MPa, Tensile elongation of dried coating film; 640% (Both being catalogue values) | Dai-ichi Kogyo Seiyaku Co., Ltd. |
| | SUPERFLEX 150HS | Aqueous dispersion of polyurethane Particle size; 0.11 μm, Glass transition point of dried coating film; 32° C. Tensile strength of dried coating film; 45 MPa, Tensile elongation of dried coating film; 480% (Both being catalogue values) | Dai-ichi Kogyo Seiyaku Co., Ltd. |
| | KP-2820 | Aqueous dispersion of polyurethane Particle size; 0.2 μm, Glass transition point of dried coating film; −20° C. Tensile strength of dried coating film; 30 MPa, Tensile elongation of dried coating film; 700% (Both being catalogue values) | Matsumoto Yushi-Seiyaku Co., Ltd. |
| Component (E) | E1 (No product name) | 3-mol Propylene oxide-added fumaric anhydride ester of bisphenol A | Mitsubishi Rayon Co., Ltd. |
| | E2 (No product name) | Copolymer of 3-mol propylene oxide-added fumaric anhydride ester of bisphenol A and 10-mol ethylene oxide-added fumaric anhydride ester of bisphenol A | Mitsubishi Rayon Co., Ltd. |
| | E3 (No product name) | Copolymer of 3-mol propylene oxide-added fumaric anhydride ester of bisphenol A and 10-mol ethylene oxide-added fumaric anhydride ester of bisphenol A | Mitsubishi Rayon Co., Ltd. |
| Component (D) | NEWCOL 723 | Nonionic surfactant, aqueous solution with 30 mass % of active ingredient | Nippon Nyukazai Co., Ltd. |
| Component (D-1) | NEWCOL 723-SF | Anionic surfactant, aqueous solution with 30 mass % of active ingredient | Nippon Nyukazai Co., Ltd. |
| Component (D-2) | FINESURF FON180E06 | Polyoxyethylene synthetic alcohol ether (ISEO) | Aoki Oil Industrial Co., Ltd. |
| Others | CN-963 | Aliphatic type polyester type bifunctional urethane acrylate Viscosity; 55,000 mP · s/60° C., Tensile elongation of cured product; 7%, Glass transition temperature of cured product; 38° C. (Both being catalogue values) | Sartomer USA, LLC |

TABLE 4-continued

| Title (product name) | Name of substance | Manufacturer |
|---|---|---|
| SUPERFLEX 150 | Aqueous dispersion of polyurethane<br>Particle size; 0.07 μm, Glass transition point of dried coating film; 40° C. Tensile strenght of dried coating film; 45 Mpa, Tensile elongation of dried coating film; 330%<br>(Both being catalogue value) | Dai-ichi Kogyo Seiyaku Co., Ltd. |
| SUPERFLEX E-4000 | Aqueous dispersion of polyurethane<br>Particle size; 0.28 μm, Glass transition point of dried coating film; −58° C. Tensile strength of dried coating film; 9.3 Mpa, Tensile elongation of dried coating film; 1000%<br>(Both being catalogue values) | Dai-ichi Kogyo Seiyaku Co., Ltd. |
| HYDRAN HW-350 | Aqueous dispersion of polyurethane<br>Particle size; 33 nm, Glass transition point of dried coating film; 57° C. Tensile strenght of dried coating film; 50 Mpa, Tensile elongation of dried coating film; <10%<br>(Both being catalogue values) | Dai-ichi Kogyo Seiyaku Co., Ltd. |
| JER834 | Bisphenol A type epoxy resin | Mitsubishi Chemical Corp. |

EXPLANATION OF REFERENCE SYBOLS

1 SUPPLY UNIT FOR REINFORCING FIBER
2 GUIDE ROLLER
3 RESIN BATH
4 GUIDE BAR
5 PERFORATED GUIDE
6 MOLD FOR PULTRUSION MOLDING
6a PULTRUSION CHANNEL
F REINFORCING FIBER(CARBON FIBER BUNDLE)

The invention claimed is:

1. A sizing agent for carbon fiber, comprising:
a compound (A) having at least one epoxy group in the molecule, which is an ester between an epoxy compound having plural epoxy groups in the molecule and an unsaturated monobasic acid;
a bifunctional type urethane acrylate oligomer (B) that gives a cured product having a tensile elongation of 40% or higher when measured by steps (i)-(iv):
  (i) applying a mixture of 97 g of the bifunctional type urethane acrylate oligomer (B) and 3 g of 2-hydroxy-2-methyl-1-phenylpropan-1-one as a curing agent on a glass substrate;
  (ii) obtaining a coating film having a thickness of 100 μm;
  (iii) curing the coating film by irradiation with ultraviolet radiation for 5 seconds from a position 10 cm away from the coating film, using an ozone type lamp (80 W/cm); and
  (iv) measuring tensile elongation using the cured coating film according to JIS K7127 (specimen type 5) at a tensile rate of 300 mm/min; and
a polyurethane resin (C) that produces a dried coating film having a tensile elongation of from 350% to 900% and a tensile strength of from 10 MPa to 50 MPa when measured by steps (v)-(vii):
  (v) applying the polyurethane resin (C) on a glass plate;
  (vi) drying the applied polyurethane resin (C) at room temperature for 15 hours;
  (vii) heating at 80° C. for 6 hours;
  (viii) subjecting to a heating treatment at 120° C. for 20 minutes;
  (ix) obtaining a coating film having a thickness of 500 μm; and
  (x) measuring tensile elongation and tensile strength according to JIS K 7127 at a tensile rate of 300 mm/min;
wherein:
  the mass ratio of the content of the compound (A) and the urethane acrylate oligomer (B) is from 1/3 to 2/1 as a ratio of urethane acrylate oligomer (B)/compound (A),
  the proportion of the total amount of the compound (A) and the urethane acrylate oligomer (B) in all of the sizing components is 20% by mass or more, and
  the proportion of the polyurethane resin (C) in all of the sizing components is from 5% by mass to 50% by mass.

2. The sizing agent for carbon fiber according to claim 1, wherein the polyurethane resin (C) has a glass transition temperature of from −50° C. to 35° C.

3. The sizing agent for carbon fiber according to claim 1, further comprising an ester compound (E) having an acid value of 50 or higher and obtained from an alkylene oxide adduct of a bisphenol compound and a dicarboxylic acid compound,
wherein the content of the ester compound (E) is 2.0 times by mass or less of the total amount of the compound (A) and the urethane acrylate oligomer (B).

4. The sizing agent for carbon fiber according to claim 1, further comprising an anionic surfactant (D-1) having an ammonium ion as a counterion and a nonionic surfactant (D-2) as surfactants (D),
wherein:
  the mass ratio of the content of the anionic surfactant (D-1) and the nonionic surfactant (D-2) is in a range of from 1/10 to 1/5 as a ratio of nonionic surfactant (D-2)/anionic surfactant (D-1), and
  the proportion of the total amount of the anionic surfactant (D-1) and the nonionic surfactant (D-2) in all of the sizing components is from 10% by mass to 25% by mass.

5. An aqueous dispersion of a sizing agent for carbon fiber, the aqueous dispersion comprising an aqueous dispersion in which the sizing agent for carbon fiber according to claim 1 is dispersed in water, and where an average particle size of the dispersed particles of the sizing agent in the aqueous dispersion of 0.3 μm or less.

6. The aqueous dispersion of a sizing agent for carbon fiber according to claim 5, wherein the polyurethane resin component (C) is an aqueous dispersion of an average particle size of 0.2 μm or less.

7. A carbon fiber bundle comprising a carbon fiber applied with the sizing agent for carbon fiber according to claim 5 attached thereto, which has been treated with an aqueous dispersion of the sizing agent, wherein the amount of applied sizing agent is from 0.6% by mass to 3.0% by mass.

8. A carbon fiber bundle comprising a carbon fiber applied with the sizing agent for carbon fiber according to claim 1 attached thereto, wherein-the amount of applied sizing agent is from 0.6% by mass to 3.0% by mass.

9. The carbon fiber bundle according to claim 8, wherein the cantilever value at 25° C. is from 200 mm to 400 mm.

10. A pultrusion molding composite material comprising the carbon fiber bundle according to claim 8.

11. The pultrusion molding composite material according to claim 10, comprising a thermosetting matrix resin.

12. A sheet-like article comprising the carbon fiber bundle according to claim 8.

13. A composite material comprising the sheet-like article according to claim 12.

14. The composite material according to claim 13, comprising a thermosetting matrix resin.

* * * * *